US009699747B2

(12) United States Patent
Kwak et al.

(10) Patent No.: US 9,699,747 B2
(45) Date of Patent: Jul. 4, 2017

(54) SYNCHRONIZATION METHOD IN DISTRIBUTED WIRELESS COMMUNICATION SYSTEM AND TERMINAL SUPPORTING THE SAME

(71) Applicant: Electronics and Telecommunications Research Institute, Daejeon (KR)

(72) Inventors: Byung-Jae Kwak, Daejeon (KR); Kapseok Chang, Daejeon (KR); June-Koo Rhee, Seongnam-si (KR); Junhyuk Kim, Daegu (KR); Kyounghye Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 129 days.

(21) Appl. No.: 14/852,375

(22) Filed: Sep. 11, 2015

(65) Prior Publication Data
US 2016/0081047 A1  Mar. 17, 2016

(30) Foreign Application Priority Data

Sep. 12, 2014  (KR) .................. 10-2014-0121385
Jan. 9, 2015   (KR) .................. 10-2015-0003575
Aug. 20, 2015  (KR) .................. 10-2015-0117537

(51) Int. Cl.
*H04J 3/06*       (2006.01)
*H04W 56/00*      (2009.01)
*H04L 12/807*     (2013.01)
*H04W 72/00*      (2009.01)

(52) U.S. Cl.
CPC .......... *H04W 56/001* (2013.01); *H04L 47/27* (2013.01); *H04W 72/00* (2013.01)

(58) Field of Classification Search
None
See application file for complete search history.

(56) References Cited

U.S. PATENT DOCUMENTS

| 7,570,656 B2 * | 8/2009 | Raphaeli | H04B 3/542 370/445 |
| 2008/0144493 A1 * | 6/2008 | Yeh | H04W 52/50 370/230 |
| 2014/0073372 A1 | 3/2014 | Lee et al. | |

(Continued)

FOREIGN PATENT DOCUMENTS

| JP | 2005064795 A | 3/2005 |
| JP | 2010288302 A | 12/2010 |

OTHER PUBLICATIONS

IEEE 802.15-14-0464-0008, Byung-Jae Kwak et al., "Motions for MAC harmonization", Sep. 17, 2014.

(Continued)

*Primary Examiner* — Anh-Vu Ly
(74) *Attorney, Agent, or Firm* — William Park & Associates Ltd.

(57) ABSTRACT

Disclosed is a synchronization method in a distributed wireless communication system and a terminal supporting the same. In a synchronization method, a terminal splits a synchronization period into a plurality of backoff slots and randomly selects a backoff counter using the contention window. Furthermore, the terminal checks whether a channel is idle during at least one of the plurality of backoff slots and changes the backoff counter based on a result of the check.

3 Claims, 24 Drawing Sheets

(56) References Cited

U.S. PATENT DOCUMENTS

2014/0211781 A1 7/2014 Kim et al.
2015/0341875 A1* 11/2015 Kwak ................ H04W 56/001
                                                              370/350
2016/0081010 A1* 3/2016 Seok ................ H04W 74/0816
                                                              370/329

OTHER PUBLICATIONS

IEEE 802.15-14-0554-00-0008, Byung-Jae Kwak et al., "Updates on Fully Distributed Synchronization Scheme for PAC", Sep. 14, 2014.
IEEE 802.15-14-0678-02-0008, Byung-Jae Kwak et al., "Proposed Text for Fully Distributed Initial Synchronization", Nov. 2014.
IEEE 802.15-15-0053-01-0008, Byung-Jae Kwak et al., "Updated Proposal on Fully Distributed Synchronization Scheme for PAC", Jan. 2015.
IEEE 802.15-15-0191-03-0008, Byung-Jae Kwak et al., "Fully Distributed Synchronization Scheme for PAC with Additional Simulations", Mar. 2015.
Osvaldo Simeone, et al., "Distributed Synchronization in Wireless Networks," IEEE Signal Processing Magazine, vol. 25, No. 5, Sep. 2008, pp. 81-97.
Renato E. Mirollo, et al., "Synchronization of Pulse-Coupled Biological Oscillators," SIAM J. Appl. Math., vol. 50, No. 6, pp. 1645-1662, Dec. 1990.

\* cited by examiner

FIG. 5

| Preamble | Backoff indicator | CW indicator |

SYNCHRONIZATION METHOD IN DISTRIBUTED WIRELESS COMMUNICATION SYSTEM AND TERMINAL SUPPORTING THE SAME

CROSS-REFERENCE TO RELATED APPLICATION

This application claims priority to and the benefit of Korean Patent Application No. 10-2014-0121385, 10-2015-0003575, 10-2015-0117537 filed in the Korean Intellectual Property Office on Sep. 12, 2014, Jan. 9, 2015, and Aug. 20, 2015, the entire contents of which are incorporated herein by reference.

BACKGROUND OF THE INVENTION (a) Field of the Invention

The present invention relates to a synchronization method in a distributed wireless communication system and a terminal supporting the same.

(b) Description of the Related Art

Wireless communication systems may be basically divided into a synchronous systems and an asynchronous systems.

A synchronous wireless communication system refers to a system in which terminals operate in accordance with a common reference time. In a synchronous wireless communication system, efficiency of the usage of radio resources can be improved and a system having excellent performance can be easily designed because a specific operation is performed at a predetermined time. Furthermore, power consumption of a terminal can be reduced through a power consumption reduction mode. For example, terminals operating in the power consumption reduction mode may operate in a reception mode only during a predetermined time, and the reception units of the terminals may be powered off in the remaining time, thereby being capable of reducing power consumption. A terminal which wants to send data to a terminal operating in the power consumption reduction mode may send the data or a control message to release the terminal from power consumption reduction model during a predetermined reception mode time.

Synchronous wireless communication systems may be divided into systems using a centralized synchronization method and systems using a distributed synchronization method. A representative example of systems using the centralized synchronization method includes a cellular system. In a cellular system, terminals within a cell perform synchronization based on synchronization signals (or timing reference signals) provided by a base station. In the distributed synchronization method, synchronization signals are not transmitted by a specific device, but terminals within a network participate in the transmission of synchronization signals to achieve synchronization. Such a distributed synchronization method is suitable for a device-to-device (D2D) communications network or an ad hoc network.

In an asynchronous wireless communication system, terminals perform transmission and reception operations without a predetermined reference time. In an asynchronous wireless communication system, terminals always monitor a radio channel in order to receive packets from other terminals within a network. If a packet is detected during the monitoring, terminals estimate the starting point of the packet using a preamble signal included in the packet and read information in the packet. An asynchronization wireless communication system can be easily implemented because there is no predetermined reference time, and is chiefly used in systems whose resource efficiency does not need to be high. However, there is a disadvantage in that power consumption is high because terminals need to always monitor a radio channel.

One of the distributed synchronization method may include the following method. Each terminal periodically sends a synchronization signal using its own synchronization timing (i.e., reference time). After receiving synchronization signals from surrounding terminals, each terminal performs its own time synchronization using the received synchronization signal. As a result, all the terminals may have a common reference time. The synchronization signal used in this case may include a pulse signal, a Zadoff-Chu (ZC) sequence, an m-sequence, and a chirp signal. In such a method, it is assumed that terminals receive synchronization signals while sending a synchronization signal. In such a method, however, if terminals are crowded, synchronization signals transmitted by the terminals may be received overlapped. Accordingly, an error may occur in estimating the reception time of a synchronization signal, or the estimation of a reception time may be impossible. Furthermore, in an unlicensed frequency band, if the same radio channel is used by networks conforming to a different protocol in the same area, there is a problem in that a synchronization signal is not transmitted or a transmitted synchronization signal may not be received due to interference.

SUMMARY OF THE INVENTION

The present invention has been made in an effort to provide a distributed synchronization method in a wireless communication system.

In accordance with an exemplary embodiment of the present invention, a synchronization method of a first terminal in a distributed wireless communication system is provided. The synchronization method may include splitting a synchronization period into a plurality of backoff slots, setting a contention window, randomly selecting a backoff counter using the contention window, checking whether a channel is idle during at least one of the plurality of backoff slots, and changing the backoff counter based on a result of the check.

Changing the backoff counter may include decreasing the backoff counter if the channel is found to be idle, and not decreasing the backoff counter if the channel is found to be busy.

The synchronization method may further include sending a synchronization signal if the value of the backoff counter is smaller than a predetermined value.

Setting the contention window may include selecting any one of integers {0, 1, 2, . . . , CW−1} as the value of the backoff counter if the contention window is a CW.

Whether the channel is idle may be checked through clear channel assessment (CCA).

The synchronization method may further include updating the contention window if the value of the first counter is smaller than a predetermined value.

The synchronization method may further include updating the contention window if the channel is idle for a predetermined time after sending the synchronization signal.

The synchronization method may further includes setting a first counter different from the backoff counter and decreasing the value of the first counter if the channel is idle.

Changing the backoff counter may include not decreasing the value of the backoff counter if the channel is found to be idle but if the transmission of a synchronization signal cannot be completed during the remaining period of the synchronization period.

Setting the contention window may include calculating an average inter-arrival time between first synchronization signals received by the first terminal, calculating an average contention window of the first terminal and other terminals using the first synchronization signals, and setting the contention window using the average inter-arrival time and the average contention window.

The synchronization method may further include controlling a synchronization timer using a first synchronization signal when the first terminal receives the first synchronization signal from a second terminal.

Controlling the synchronization timer may include changing the phase of the synchronization timer to a predetermined specific value regardless of the first synchronization signal if the phase of the synchronization timer is between a first value and a second value.

The first synchronization signal may include a backoff indicator indicative of a point of time at which a frame of the first terminal is started. Controlling the synchronization timer may include controlling the phase value of the synchronization timer using the phase value of the synchronization timer corresponding to the backoff indicator.

In accordance with another exemplary embodiment of the present invention, a synchronization method of a first terminal in a distributed wireless communication system is provided. The synchronization method may include receiving first synchronization signals from the first terminal and second terminals different from the first terminal, calculating an average inter-arrival time between the first synchronization signals, calculating an average contention window of the second terminals using the first synchronization signals, setting a first contention window which is a contention window of the first terminal using the average inter-arrival time and the average contention window, and determining whether or not to send a synchronization signal in response to the first contention window.

Determining whether or not to send the synchronization signal may include randomly selecting a backoff counter using the first contention window, decreasing the value of the backoff counter if a channel is idle during backoff slots of a plurality of periods split from a synchronization period, and sending the synchronization signal if the value of the backoff counter is zero.

The synchronization method may further include setting the value of the backoff counter as a predetermined value after sending the synchronization signal, and updating the first contention window if the set value of the backoff counter is zero.

In accordance with another exemplary embodiment of the present invention, a terminal is provided. The terminal may include an RF module configured to send and receive a synchronization signal and a processor configured to split the synchronization period into a plurality of backoff slots, randomly select a backoff counter using a contention window, and decrease the value of the backoff counter if a channel is idle during a first backoff slot of the plurality of backoff slots.

The processor may send a synchronization signal if the backoff counter is zero.

The processor may set the value of the backoff counter as a predetermined value after sending the synchronization signal, and update the contention window if the set value of the backoff counter is zero.

The processor may calculate an average inter-arrival time between received synchronization signals, may calculate an average contention window of the terminal and other terminals using the received synchronization signals, and may set the contention window using the average inter-arrival time and the average contention window.

BRIEF DESCRIPTION OF THE DRAWINGS

FIG. 5 is a diagram showing the configuration of a synchronization signal in accordance with an exemplary embodiment of the present invention.

DETAILED DESCRIPTION OF THE EMBODIMENTS

Figure 1:
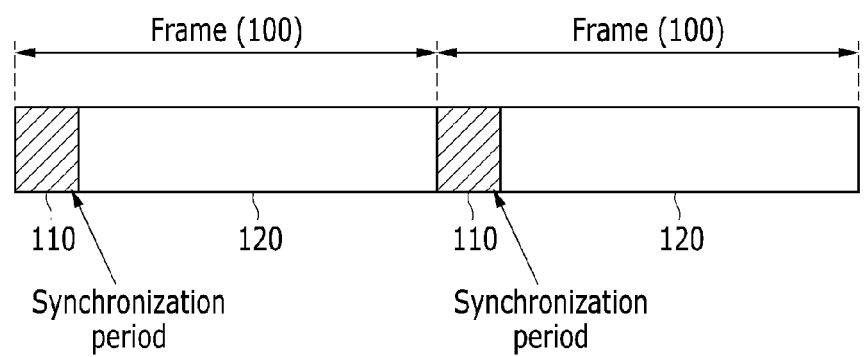
FIG. 1 is a diagram showing time resources in accordance with an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), or user equipment (UE), and may include some or all of the functions of the MT, MS, AMS, HR-MS, SS, PSS, AT, and UE.

Furthermore, a base station (BS) may refer to an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) functioning as a base station, or a high reliability relay station (HR-RS) functioning as a base station, and may include some or all of the functions of the ABS, HR-BS, nodeB, eNodeB, AP, RAS, BTS, MMR-BS, RS, and HR-RS.

A synchronization method (or distributed synchronization method) in a distributed communication system in accordance with an exemplary embodiment of the present invention and a terminal supporting the same are described below in detail. A distributed wireless communication system environment is assumed and described hereinafter, and a detailed description of a distributed wireless communication system is omitted because the distributed wireless communication system is well known to those skilled in the art to which the present invention pertains. Furthermore, a distributed synchronization method is described hereinafter based on the operation of the terminal.

FIG. 1 is a diagram showing time resources in accordance with an exemplary embodiment of the present invention.

As shown in FIG. 1, the time resources in accordance with an exemplary embodiment of the present invention include a frame 100 that is periodically repeated. In FIG. 1, it is assumed that the length of the frame 100 has been previously determined.

The frame 100 is divided into a plurality of periods. FIG. 1 illustrates only a synchronization period 110 of the plurality of periods. That is, FIG. 1 illustrates that the time resources are divided into the frames 100 and each of the frames 100 is subdivided into the synchronization period 110 and a remaining period 120. The remaining period 120 may be divided into a data period and a search period, but is not illustrated in FIG. 1 for convenience sake. The synchronization period 110 may be placed anywhere in the frame, and the synchronization period 110 has been illustrated as being placed at the front of the frame in FIG. 1, for convenience sake. A guard interval may be placed between the periods forming the frame 100.

The synchronization period 110 is a period in which terminals send synchronization signals. Terminals may be aware of the start and end locations of a frame using a synchronization signal received in the synchronization period 110.

Figure 2:
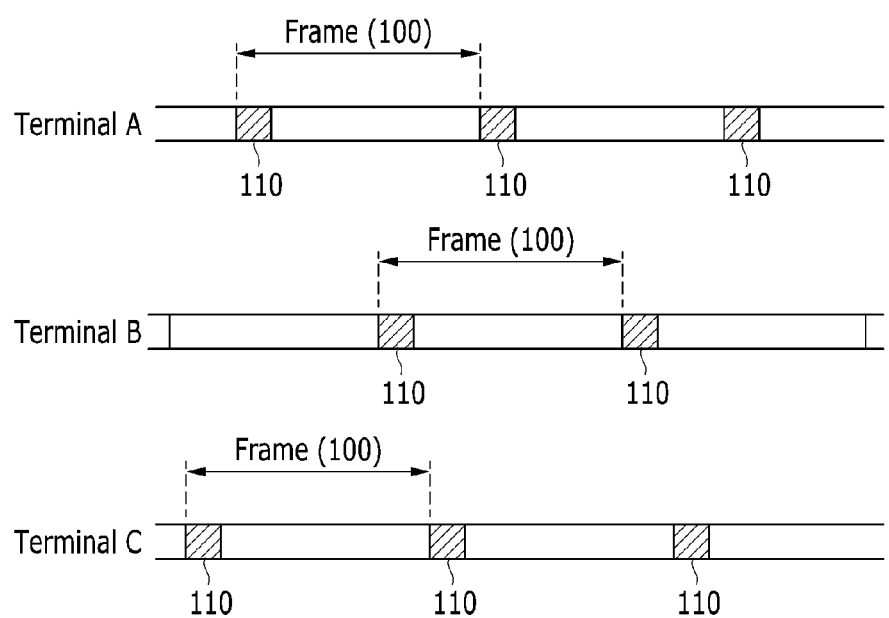
FIG. 2 is a diagram showing an example in which three terminals A, B, and C are not synchronized.
Figure 3:
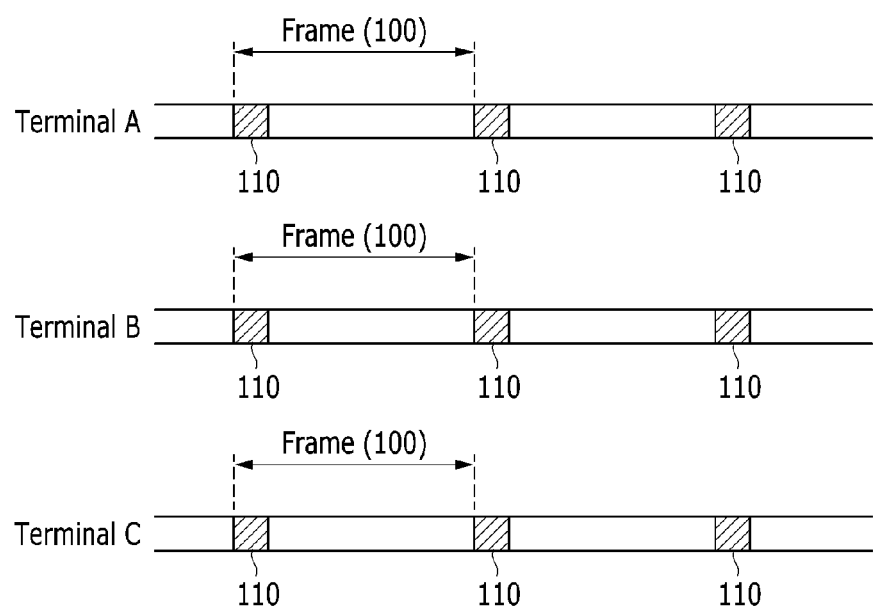
FIG. 3 is a diagram showing an example in which three terminals A, B, and C are synchronized.

FIG. 2 is a diagram showing an example in which three terminals A, B, and C are not synchronized, and FIG. 3 is a diagram showing an example in which three terminals A, B, and C are synchronized.

As shown in FIG. 2, points of time at which the frames of terminal A, terminal B, and terminal C are started are not identical with each other.

The objective of synchronization is to perform synchronization between terminals that are not synchronized. If points of time at which the frames of two terminals are started are the same, the two terminals may be said to be "synchronized."

Furthermore, if a plurality of terminals within a predetermined network are synchronized in the situation in which the plurality of terminals are presented in the network, the network may be said to be "synchronized."

As shown in FIG. 3, points of time at which the frames of terminal A, terminal B, and terminal C are started are the same. In an actual network, it may be impossible to accurately synchronize terminals. Accordingly, it may be said to be synchronized if a difference between points of time at which the frames of terminals are started is less than an error range.

Figure 4:
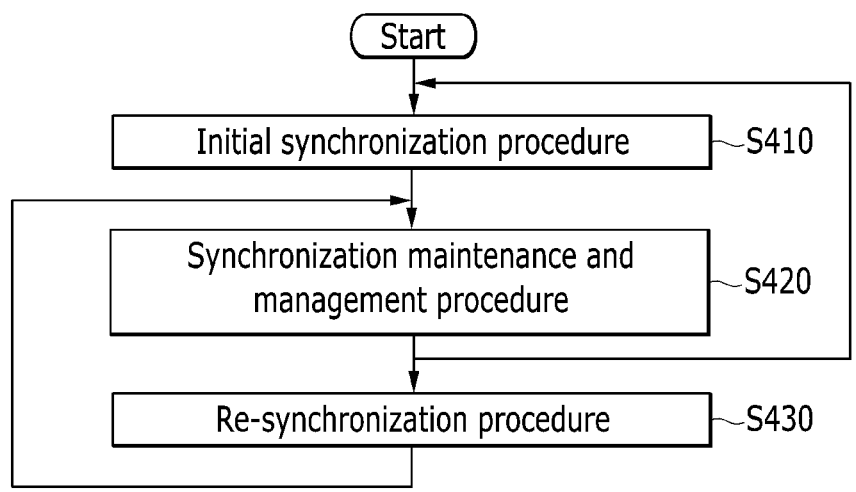
FIG. 4 is a flowchart illustrating a synchronization method in accordance with an exemplary embodiment of the present invention.

FIG. 4 is a flowchart illustrating a synchronization method in accordance with an exemplary embodiment of the present invention.

As shown in FIG. 4, the synchronization method in accordance with an exemplary embodiment of the present invention includes an initial synchronization procedure S410, a synchronization maintenance and management procedure S420, and a re-synchronization procedure S430.

Terminals that are not synchronized are synchronized in accordance with the initial synchronization procedure S410. For example, when a terminal is powered on, the terminal performs synchronization in accordance with the initial synchronization procedure. A terminal which has successfully performed initial synchronization performs the synchronization maintenance and management procedure S420. Furthermore, if the terminal has determined that it has lost synchronization while performing the synchronization maintenance and management procedure, the terminal performs the re-synchronization procedure S430 or the initial synchronization procedure S410.

The initial synchronization procedure S410, the synchronization maintenance and management procedure S420, and the re-synchronization procedure S430 include a combination of three operations, including the transmission of a synchronization signal, the reception of a synchronization signal, and the update of a synchronization time.

The synchronization signal (or timing reference signal) is transmitted in order to synchronize terminals.

Figure 5:
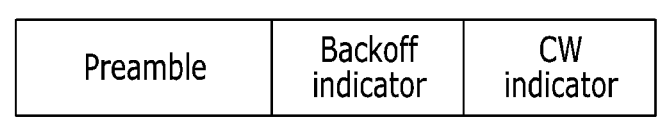

FIG. 5 is a diagram showing the configuration of a synchronization signal in accordance with an exemplary embodiment of the present invention.

As shown in FIG. 5, the synchronization signal in accordance with an exemplary embodiment of the present invention includes a preamble field, a backoff indicator field, and a contention window (CW) indicator field. The CW indicator field is an optional field. The synchronization signal may include other fields in addition to the fields of FIG. 5.

The preamble field may be used to detect a synchronization signal, perform automatic gain control (AGC) by a reception unit, estimate the time when the synchronization signal was received, and estimate a radio channel when the synchronization signal is received by the reception unit of a terminal. The preamble is placed at the front of the synchronization signal.

The backoff indicator field is indicative of a difference between the starting point of the synchronization period 110 and a point of time at which the synchronization signal was transmitted. As shown in FIG. 1, if the synchronization period 110 is placed at the front of the frame 100, the starting point of the synchronization period and the starting point of time of the frame are the same. The backoff indicator field is placed behind the preamble field.

Terminals do not send a synchronization signal in the synchronization period of all frames. If all the terminals send synchronization signals in the synchronization period of each frame, a collision may occur between the synchronization signals because there are so many synchronization signals transmitted in the synchronization period in an area where terminals are crowded. Accordingly, if terminals are crowded, a probability that the terminals may send synchronization signals in a synchronization period is reduced. If terminals are not crowded, a probability that the terminals may send synchronization signals in a synchronization period is increased. Accordingly, frequency of the synchronization signal may be constantly maintained. The CW indicator field includes the contention window value of a terminal that has sent a synchronization signal. For example, a method similar to carrier sense multiple access with collision avoidance (CSMA/CA) used in the distributed coordination function (DCF) of IEEE 802.11 may be used as a method of determining a probability that a terminal sends a synchronization signal. If such a method is used, the CW indicator field may include the value of a contention window size. A synchronization signal may not include a CW indicator field. If a contention window field is present, the CW indicator field is placed behind the preamble field. Furthermore, the CW indicator field may be placed behind or ahead of the backoff indicator field.

Figure 6:
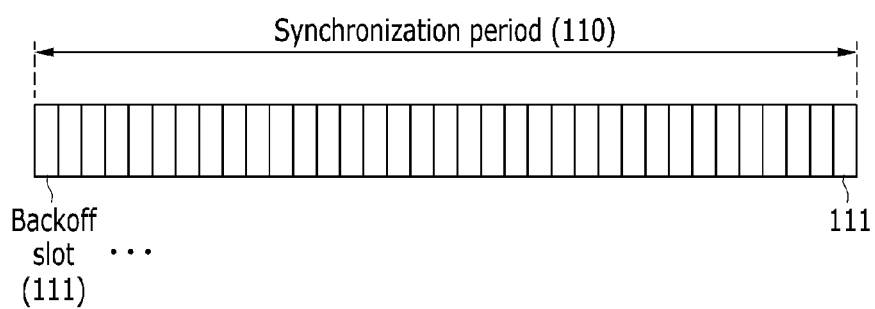
FIG. 6 is a diagram showing the structure of a synchronization period 110 in accordance with an exemplary embodiment of the present invention.

FIG. 6 is a diagram showing the structure of the synchronization period 110 in accordance with an exemplary embodiment of the present invention.

As shown in FIG. 6, the synchronization period 110 in accordance with an exemplary embodiment of the present invention includes N backoff slots 111.

The size of the backoff slots may be smaller than or equal to the size of a synchronization signal.

In order to reduce a probability that a collision may occur between synchronization signals transmitted by other terminals, a synchronization signal is transmitted using a random access method. A synchronization signal is transmitted at a point of time at which a backoff slot is started.

Figure 7:
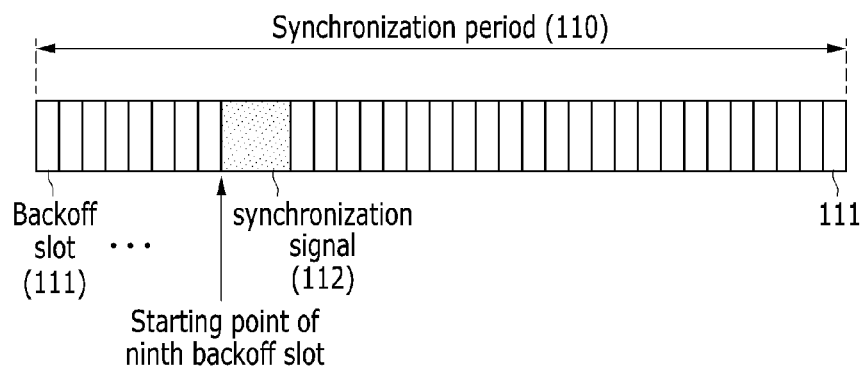
FIG. 7 is a diagram showing an example of the position where a synchronization signal is transmitted.

FIG. 7 is a diagram showing an example of the position where a synchronization signal is transmitted.

FIG. 7 shows an example in which the transmission of a synchronization signal is started at a point of time at which the ninth backoff slot is started. As shown in FIG. 7, the synchronization signal 112 is transmitted at a point of time at which the ninth backoff slot is started. In FIG. 7, the length of the synchronization signal is assumed to be the same as the length of three backoff slots.

Figure 8:
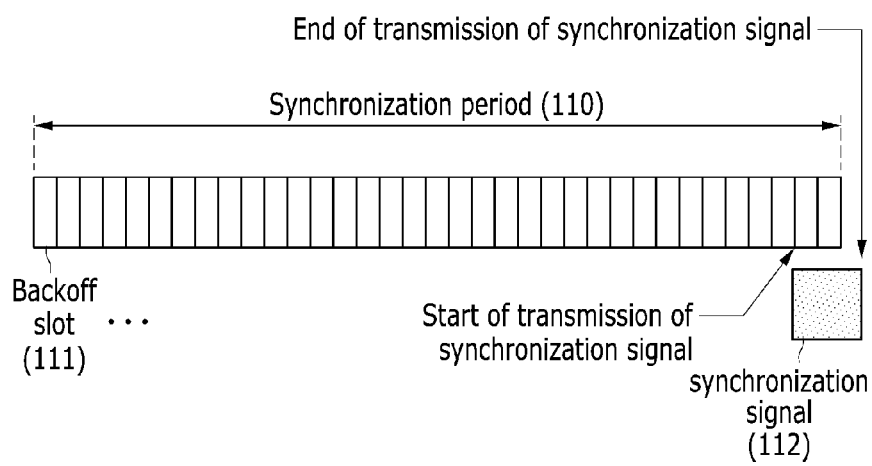
FIG. 8 is a diagram showing an example in which the transmission of a synchronization signal is not completed within a synchronization period.

FIG. 8 is a diagram showing an example in which the transmission of a synchronization signal is not completed within a synchronization period.

The transmission of a synchronization signal needs to be completed before the synchronization period 110 is terminated. If the transmission of a synchronization signal is completed after the synchronization period 110 is terminated as shown in FIG. 8, the synchronization signal is not transmitted. As will be described later, if a synchronization signal is not transmitted because the transmission of the synchronization signal has not been completed, the value of a backoff counter is not reduced even though a corresponding backoff slot is idle.

A synchronization signal in accordance with an exemplary embodiment of the present invention is transmitted using a random access method. The random access method may be a contention-based random access method using a contention window (CW). The random access method is described in detail below.

Figure 9A:
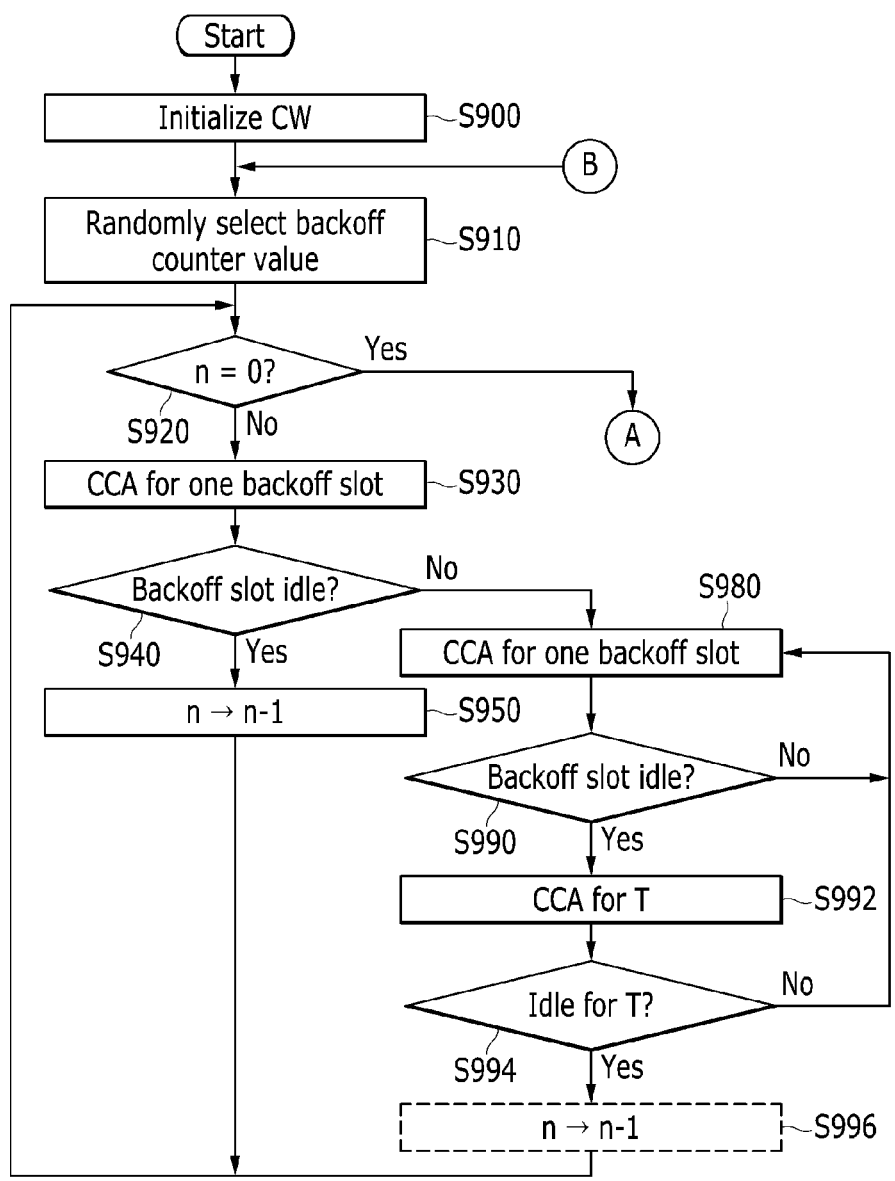
FIGS. 9A and 9B are flowcharts illustrating a random access method in accordance with an exemplary embodiment of the present invention.
Figure 9B:
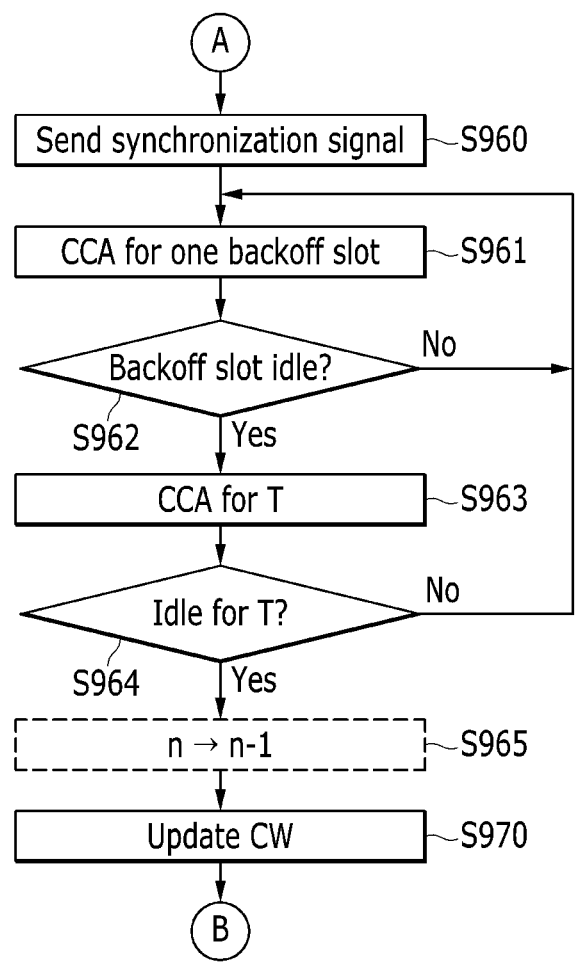

FIGS. 9A and 9B are flowcharts illustrating a random access method in accordance with an exemplary embodiment of the present invention. The random access method in accordance with an exemplary embodiment of the present invention is a random backoff procedure using a CW.

First, the values of contention window sizes are stored in terminals. In this case, the size of the CW is initialized when a random backoff procedure is started at step S900.

Each of the terminals selects a backoff counter value based on the current contention window size at step S910. For example, if the contention window size of a terminal is $W_C$, the corresponding terminal randomly selects one of integers $\{0, 1, 2, \ldots, W_C-1\}$. If the integer n is selected, the terminal determines "n" to be its own backoff counter value.

If n=0 at step S920, the terminal sends a synchronization signal in a next backoff slot at step S960. If the n value is not zero, step S930 below is performed.

After sending the synchronization signal, the terminal performs clear channel assessment (CCA) for a next backoff slot at step S961. A detailed description of a method of performing CCA by the terminal is omitted because the method is known to those skilled in the art to which the present invention pertains.

The terminal checks whether the next backoff slot is idle by performing CCA at step S962. If, as a result of the check at step S962, the next backoff slot is found to not be idle, the terminal continues to perform CCA for a next backoff slot until a result of the CCA becomes idle at step S961. In contrast, if, as a result of the check at step S962, the next backoff slot is found to be idle, the terminal additionally performs CCA during a predetermined time T at step S963. In this case, the predetermined time T may be T=0 or T>0.

If T≥0 at step S963 and a result of the execution of the CCA is not idle at step S964, the terminal performs step S961. Furthermore, if a result of the execution of the CCA is idle at step S963 or T=0 at step S964, the terminal may decrease its own backoff counter value by 1 or may not decrease its own backoff counter value, at step S965. That is, step S965 is optional.

After performing step S965, the terminal updates its contention window size at step S970 and moves to step S910.

If n>0 at step S920, the terminal performs CCA during a next backoff slot at step S930.

If, as a result of the execution of the CCA at step S930, the next backoff slot is idle, the terminal decreases the backoff counter value by 1 at step S940 and step S950. Furthermore, the terminal moves to step S920. If, as a result of the execution of the CCA at step S930, the next backoff slot is not idle at step S940, the terminal performs CCA again in a next backoff slot at step S980.

If, as a result of the execution of the CCA at step S980, the corresponding backoff slot is not idle at step S990, the terminal repeatedly performs CCA during a next backoff slot until a result of the CCA becomes idle, at step S980. Furthermore, if, as a result of the execution of the CCA at step S980, a corresponding backoff slot is idle at step S990, the terminal additionally performs CCA during a predetermined time T at step S992. In this case, the predetermined time T may be T=0 or T>0.

If T>0 at step S992 and a result of the execution of the CCA is not idle at step S994, the terminal performs step S980. In contrast, if a result of the execution of the CCA is idle at step S992 or T=0 at step S994, the terminal may decrease its own backoff counter value by 1 or may not decrease its own backoff counter value at step S996. That is, step S996 is optional. After performing step S996, the terminal moves to step S920.

Figure 10:
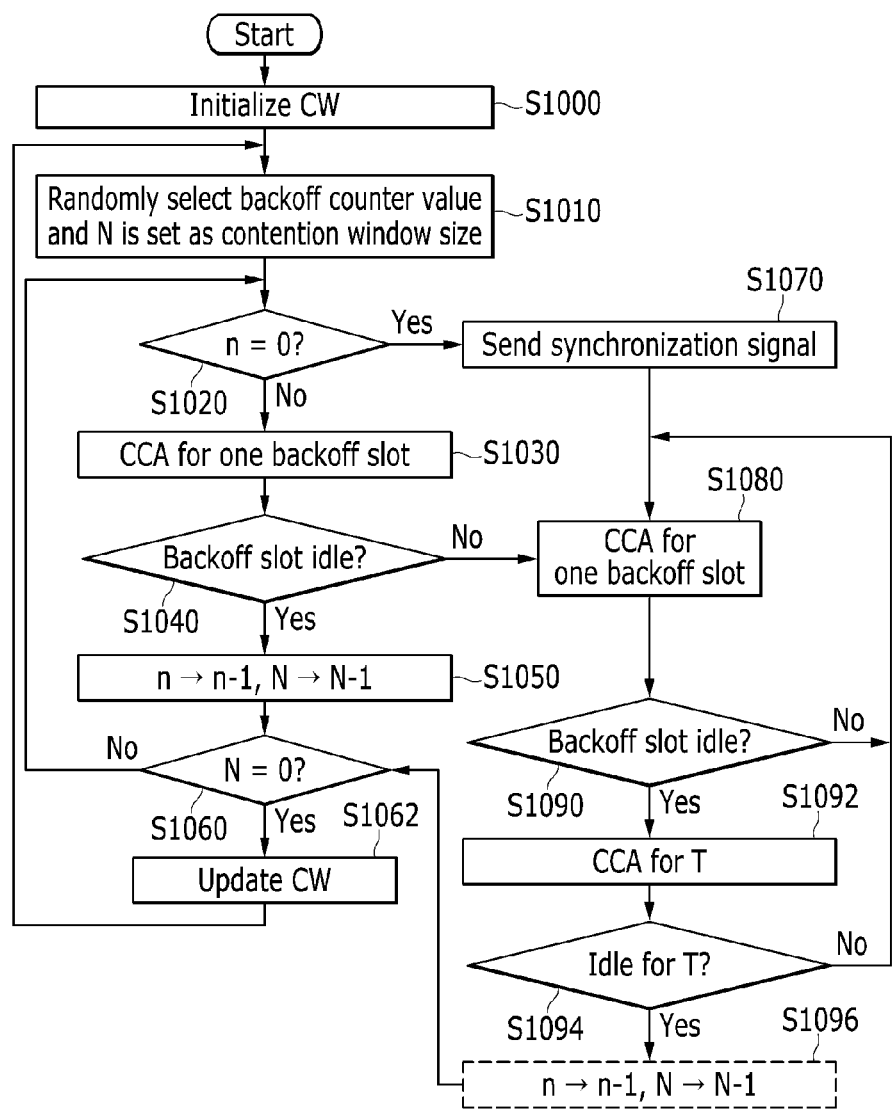
FIG. 10 is a flowchart illustrating a random access method in accordance with another exemplary embodiment of the present invention.

FIG. 10 is a flowchart illustrating a random access method in accordance with another exemplary embodiment of the present invention. The random access method in accordance with another exemplary embodiment of the present invention is a procedure having improved fairness between terminals compared to FIG. 9. In other words, in the random access method in accordance with another exemplary embodiment of the present invention, after sending a synchronization signal, a terminal sets its backoff counter value to Wc−n again and updates a contention window size when the counter becomes 0.

The value of a contention window size is stored in each of terminals. In this case, the size of the CW is initialized when a random backoff procedure is started at step S1000.

Each of the terminals selects its own backoff counter value based on the current size of a CW at step S1010. For example, if the contention window size of a terminal is $W_C$, the terminal randomly selects one of integers {0, 1, 2, . . . , $W_C-1$}. If the integer n is selected, the terminal determines "n" to be its own backoff counter value. Furthermore, N is set as a contention window size $W_C$. In this case, N is a counter for counting the number of backoffs after updating the backoff counter value with a specific integer.

If n=0 at step S1020, the terminal sends a synchronization signal in a next backoff slot at step S1070. If n is not zero, the terminal performs step S1030.

After sending the synchronization signal, the terminal performs clear channel assessment (CCA) during a next backoff slot at step S1080.

The terminal checks whether a corresponding backoff slot is idle by performing CCA at step S1090. If, as a result of the check at steps S1090, the corresponding backoff slot is idle, the terminal additionally performs CCA during a predetermined time T at S1092. In this case, the predetermined time T may be T=0 or T>0. In contrast, if, as a result of the check at steps S1090, the corresponding backoff slot is not idle, the terminal moves to step S1080.

If T>0 at step S1092 and a result of the execution of the CCA is not idle at step S1094, the terminal performs step S1080. Furthermore, if a result of the execution of the CCA is idle at step S1092 or T=0 at step S1094, the terminal may decrease each of its own backoff counter values and N by 1 or may not decrease its own backoff counter value and N, at step S1096. That is, step S1096 is optional.

If N=0 at step S1060, the terminal updates its own contention window size at step S1062 and moves to step S1010. In contrast, if N is not 0 at step S1060, the terminal moves to step S1020.

If n>0 at step S1020, the terminal performs CCA during a next backoff slot at step S1030.

If, a result of the execution of the CCA at step S1030, a corresponding backoff slot is idle at step S1040, the terminal decreases each of the backoff counter values and N by 1, at step S1050. The terminal then moves to step S1060. If, as a result of the execution of the CCA at step S1030, a corresponding backoff slot is not idle, the terminal moves to step S1080.

Figure 11:
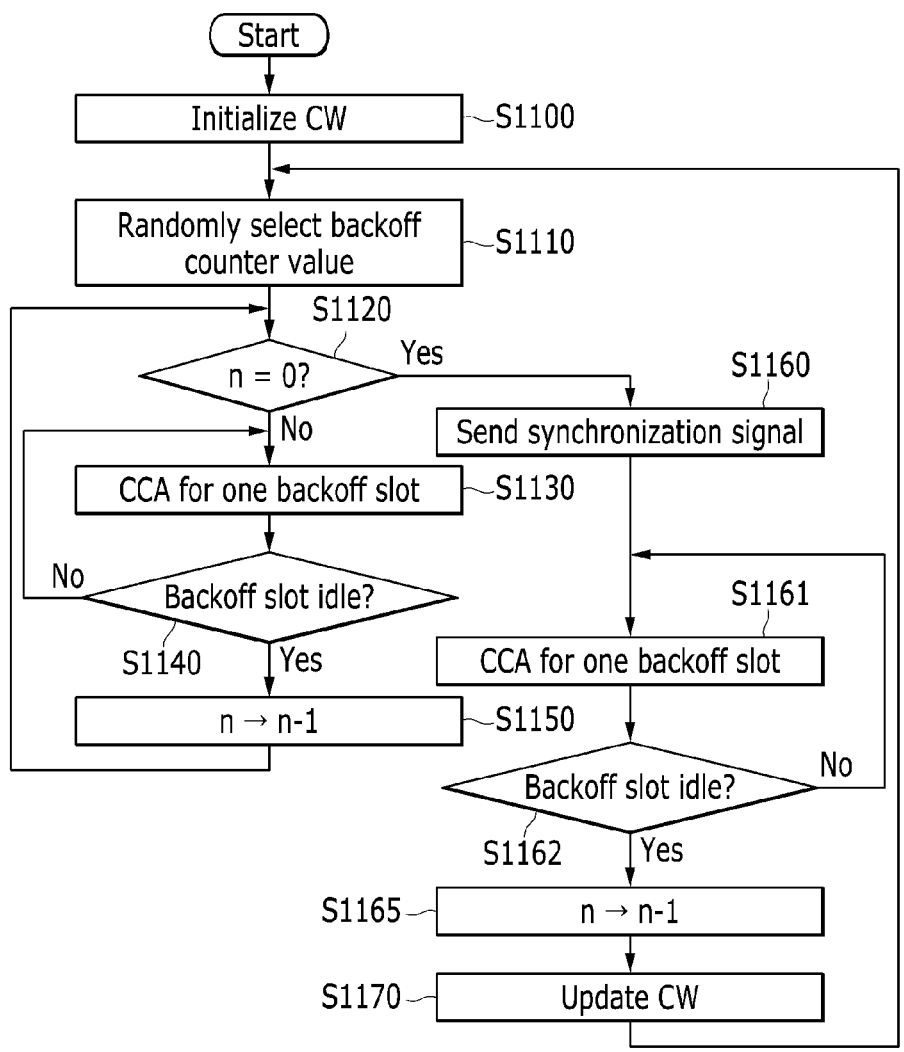
FIG. 11 is a flowchart illustrating an example in which T=0 in the random access method of FIG. 9.

FIG. 11 is a flowchart illustrating an example in which T=0 in the random access method of FIG. 9. That is, the flowchart of FIG. 11 has been simplified using steps S965 and S996 which are optional if T=0 in FIG. 9. Accordingly, a detailed description of the random access method of FIG. 11 is omitted because the random access method of FIG. 11 is the same as that of FIG. 9.

Figure 12:
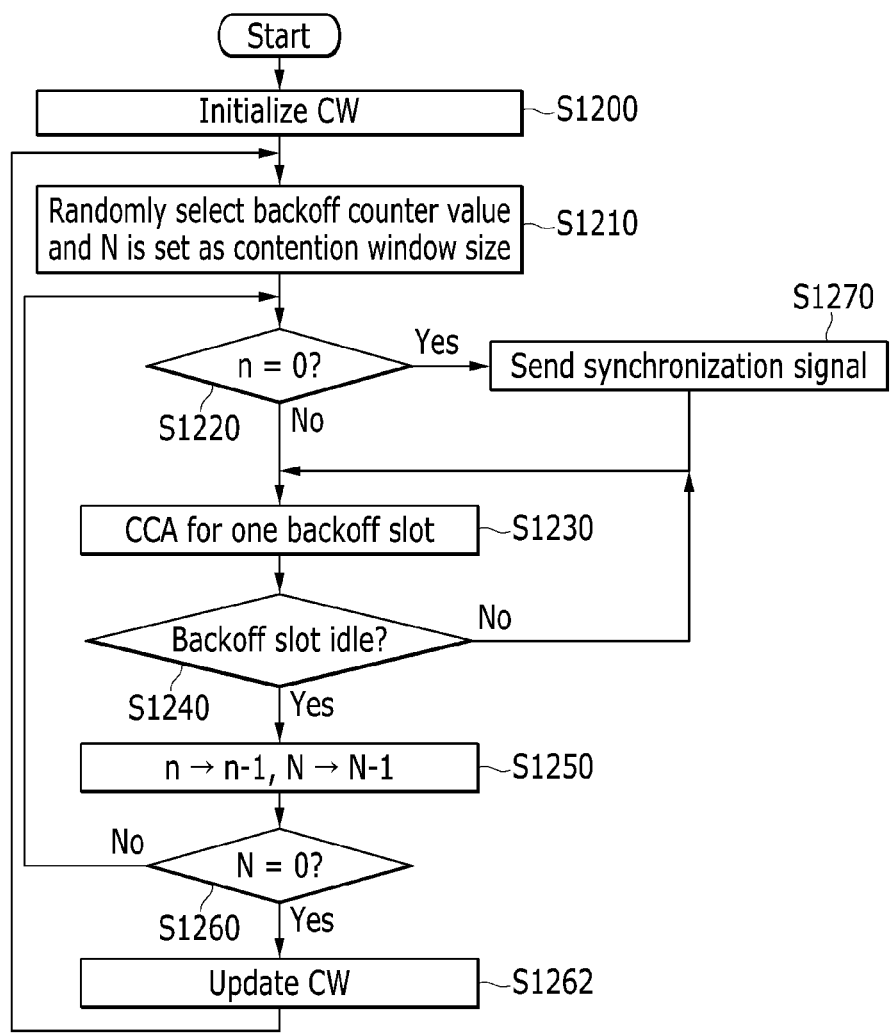
FIG. 12 is a flowchart illustrating an example in which T=0 in the random access method of FIG. 10.

FIG. 12 is a flowchart illustrating an example in which T=0 in the random access method of FIG. 10. That is, the flowchart of FIG. 12 has been simplified using step S1096 which is optional if T=0 in FIG. 10. Accordingly, a detailed description of the random access method of FIG. 12 is omitted because the random access method of FIG. 12 is the same as that of FIG. 10.

Figure 13:
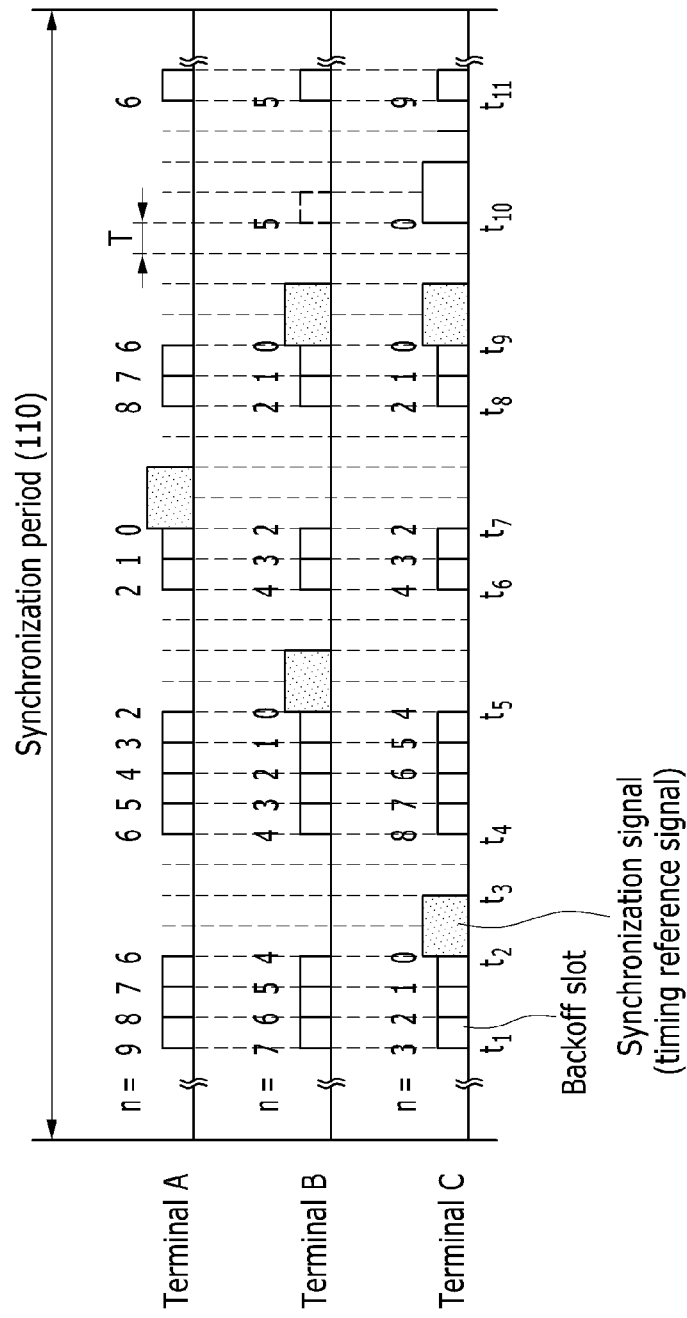
FIG. 13 is a diagram showing the transmission of synchronization signals on a time axis if the random access method of FIG. 9 is applied.

FIG. 13 is a diagram showing the transmission of synchronization signals on a time axis if the random access method of FIG. 9 is applied. More specifically, FIG. 13 illustrates the transmission of synchronization signals by a terminal A, a terminal B, and a terminal C on a time axis if T is the same as the length of one backoff slot and optional steps S965 and S996 are not used in the random access method of FIG. 9. In FIG. 13, it is assumed that the length of the synchronization signal is twice the backoff slot.

At a point of time $t_1$, it is assumed that the terminal A, the terminal B, and the terminal C have respective backoff counter values of 9, 7, and 3.

At a point of time $t_2$, the backoff counter value of the terminal C becomes zero, and the terminal C starts to send a synchronization signal. In this case, the terminal A and the terminal B have respective backoff counter values 6 and 4. That is, since backoff slots are idle between the points of time $t_1$ and $t_2$, the backoff counter values of the terminal A, terminal B, and terminal C are gradually decreased in accordance with steps S920, S930, S940, and S950 of FIG. 9.

At a point of time $t_3$, the terminal C completes the transmission of the synchronization signal.

At a point of time $t_4$ after a point of time corresponding to (one backoff slot+T), the terminal C randomly determines a backoff counter value. In FIG. 13, it is assumed that the terminal C has set the backoff counter value to 8. That is, the terminal C updates the backoff counter value to 8 in accordance with steps S961, S962, S963, S964, S970, and S910 of FIG. 9. In this case, the terminal A and the terminal B maintain their backoff counter values 6 and 4 in accordance with steps S980, S990, S992, and S994 of FIG. 9.

At a point of time $t_5$, the backoff counter value of the terminal B becomes zero, and the terminal B starts to send a synchronization signal.

At a point of time $t_6$, the terminal B determines 4 to be a randomly selected backoff counter value. At this time, the backoff counter values of the terminals A and C are 2 and 4.

At a point of time $t_7$, the backoff counter value of the terminal A becomes zero, and the terminal A starts to send a synchronization signal.

Furthermore, at a point of time $t_8$, the terminal A determines 8 to be a randomly selected backoff counter value. At this time, the backoff counter values of the terminals B and C are 2 and 2.

At a point of time $t_9$, both the backoff counter values of the terminals B and C become zero, and the terminal B and the terminal C simultaneously start to send synchronization signals. That is, the synchronization signals of the terminal B and the terminal C collide against each other.

At a point of time $t_{10}$, the terminal B determines 5 to be a randomly selected backoff counter value, and the terminal C determines 0 to be a randomly selected backoff counter value. At this time, the terminal C starts to send a synchronization signal at a point of time $t_{10}$ because the backoff counter value of the terminal C is zero. Furthermore, the terminal B does not decrease the backoff counter value because a result of CCA is not idle due to the synchronization signal of the terminal C.

Furthermore, at a point of time $t_{11}$, the terminal C determines 9 to be a randomly selected backoff counter value. At this time, the backoff counter values of the terminals A and B are 6 and 5.

Figure 14:
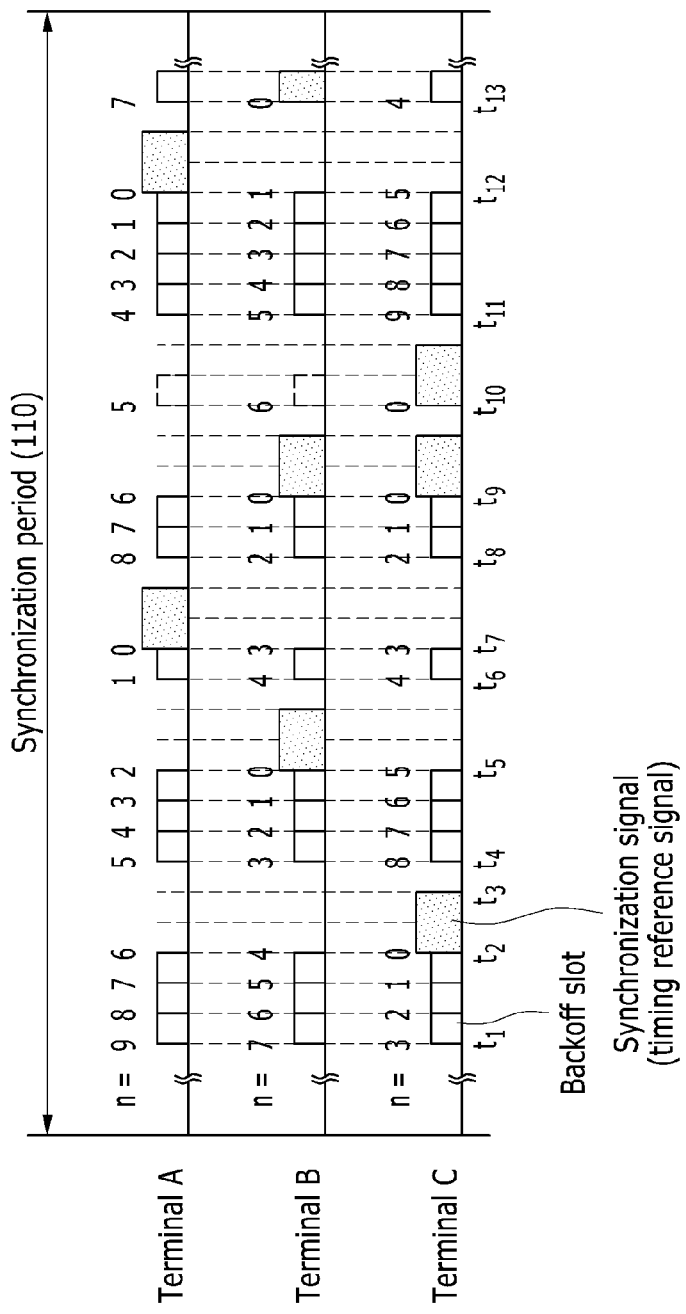
FIG. 14 is a diagram showing the transmission of synchronization signals on a time axis if the random access method of FIG. 11 is applied.

FIG. 14 is a diagram showing the transmission of synchronization signals on a time axis if the random access method of FIG. 11 is applied. That is, FIG. 14 illustrates the transmission of synchronization signals by a terminal A, a terminal B, and a terminal C on a time axis if T=0 and optional steps S965 and S996 are used in the random access method of FIG. 9. In FIG. 14, it is assumed that the length of the synchronization signal is twice the backoff slot.

At a point of time $t_1$, it is assumed that the terminal A, the terminal B, and the terminal C have respective backoff counter values of 9, 7, and 3.

At a point of time $t_2$, the backoff counter value of the terminal C becomes zero, and thus the terminal C starts to send a synchronization signal. At this time, the terminal A and the terminal B have respective backoff counter values 6 and 4. That is, since backoff slots are idle between the points of time $t_1$ and $t_2$, the backoff counter values of the terminal A, terminal B, and terminal C are gradually reduced in accordance with steps S1120, S1130, S1140, and S1150 of FIG. 11.

At a point of time $t_3$, the terminal C completes the transmission of the synchronization signal.

Since T=0, the terminal C randomly selects a backoff counter value at a point of time $t_4$ after a point of time corresponding to one backoff slot. In FIG. 14, it is assumed that the terminal C has set the backoff counter value to 8. That is, the terminal C randomly selects 8 as the backoff counter value in accordance with steps S11611, S1162, S1165, S1170, and S1110 of FIG. 11. At this time, the terminal A and the terminal B reduce their backoff counter values to 5 and 3 in accordance with steps S1120, S1130, S1140, and S1150 of FIG. 11.

At a point of time $t_5$, the backoff counter value of the terminal B becomes zero, and thus the terminal B starts to send a synchronization signal.

At a point of time $t_6$, the terminal B determines 4 to be a randomly selected backoff counter value. At this time, the backoff counter values of the terminals A and C are reduced to 1 and 4, respectively.

At a point of time $t_7$, the backoff counter value of the terminal A becomes zero, and thus the terminal A starts to send a synchronization signal.

Furthermore, at a point of time $t_8$, the terminal A determines 8 to be a randomly selected backoff counter value. At this time, the backoff counter values of the terminals B and C are reduced to 2 and 2, respectively.

At a point of time $t_9$, both the backoff counter values of the terminals B and C become zero, and thus the terminal B and the terminal C simultaneously start to send synchronization signals. That is, the synchronization signals of the terminal B and the terminal C collide against each other.

At a point of time $t_{10}$, the terminal B determines 6 to be a randomly selected backoff counter value, and the terminal C determines 0 to be a randomly selected backoff counter value. Furthermore, the terminal C starts to send a synchronization signal at the point of time $t_{10}$ because the backoff counter value of the terminal C is zero. Furthermore, the terminal B detects that a result of the CCA is not idle due to the synchronization signal of the terminal C.

At a point of time $t_{11}$, the terminal C determines 9 to be a randomly selected backoff counter value. At this time, the backoff counter values of the terminals A and B are reduced to 4 and 3, respectively.

At a point of time $t_{12}$, the backoff counter value of the terminal A becomes zero, and thus the terminal A starts to send a synchronization signal.

At a point of time $t_{13}$, the terminal A determines 7 to be a randomly selected backoff counter value. At this time, the backoff counter values of the terminals B and C are reduced to 0 and 4, respectively. The terminal B starts to send a synchronization signal at the point of time $t_{13}$ because the backoff counter value of the terminal B is zero.

Figure 15:
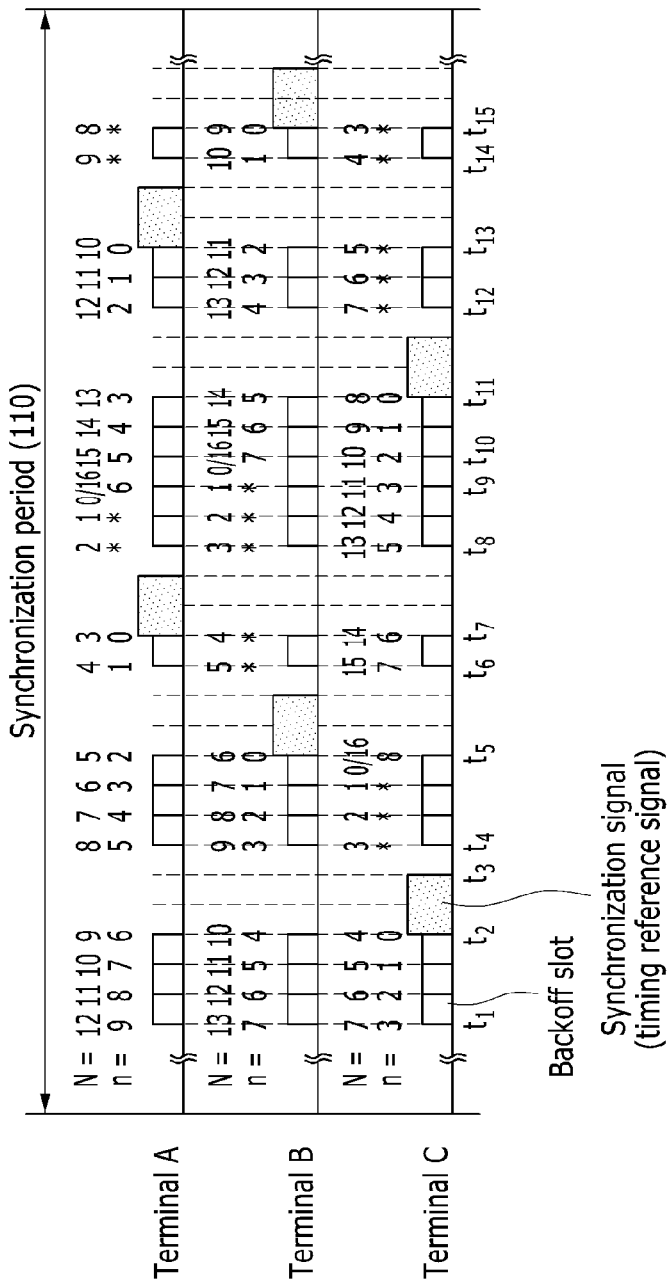
FIG. 15 is a diagram showing the transmission of synchronization signals on a time axis if the random access method of FIG. 12 is applied.

FIG. 15 is a diagram showing the transmission of synchronization signals on a time axis if the random access method of FIG. 12 is applied. That is, FIG. 15 illustrates the transmission of synchronization signals by terminal A, terminal B, and terminal C if T=0 and optional step S1096 is used in the random access method of FIG. 10. In FIG. 15, it is assumed that the length of the synchronization signal is twice a backoff slot and a contention window size is 16. The terminals may have different contention window sizes (i.e., contention window values) and the contention window size may be changed depending on a surrounding environment, but it is assumed that in FIG. 15, the terminal A, the terminal B, and the terminal C have the same contention window size of 16, for convenience of description.

At a point of time $t_1$, it is assumed that the terminal A, the terminal B, and the terminal C have (9, 12), (7, 13), and (3, 7), respectively, as a value (n, N). In this case, n is a backoff counter value, and N is a counter for counting the number of backoffs after a backoff counter value is updated with a specific integer.

At a point of time $t_2$, the backoff counter value of the terminal C becomes zero, and thus the terminal C starts to send a synchronization signal. In this case, the terminal C has N=4, and the terminal A and the terminal B have (n, N)=(6, 9) and (n, N)=(4, 10), respectively. That is, since backoff slots are idle between the points of time $t_1$ and $t_2$, (n, N) of the terminal A, terminal B, and terminal C is gradually reduced in accordance with steps S1220, S1230, S1240, S1250, and S1260 of FIG. 12.

At a point of time $t_3$, the terminal C completes the transmission of the synchronization signal.

Since T=0, the terminal A, the terminal B, and the terminal C have (n, N)=(5, 8), (n, N)=(3, 9), and (n, N)=(*, 3), respectively, at a point of time $t_4$ after a point of time corresponding to one backoff slot. That is, the terminal A and the terminal B reduce (n, N) to (5, 8) and (3, 9) in accordance with steps S1220, S1230, S1240, S1250, and S1260. Furthermore, the terminal C sets (n, N) as (*, 3) in accordance with steps S1230, S1240, and S1250. In this case, "*" means that the n value may have any value other than n=0. That is, at the point of time $t_4$, the terminal C may perform a process of reducing only the counter N value without setting the backoff counter value to a specific integer value.

At a point of time $t_5$, the backoff counter value of the terminal B becomes zero, and thus the terminal B starts to send a synchronization signal. At this time, the terminal B has N=6. Furthermore, at the point of time $t_5$, the N value of the terminal C becomes zero, and thus the terminal C updates the contention window size (refer to steps S1260, S1262, and S1210). The terminal C randomly sets the backoff counter value to 8 using the updated contention window size. In FIG. 15, it is assumed that the updated contention window size is 16. The terminal A has (n, N)=(2, 5).

At a point of time $t_6$, the terminal A, the terminal B, and the terminal C have (n, N)=(1, 4), (n, N)=(*, 5), and (n, N)=(7, 15), respectively.

At a point of time $t_7$, the backoff counter value of the terminal A becomes zero, and thus the terminal A starts to send a synchronization signal.

At a point of time $t_8$, the terminal A, the terminal B, and the terminal C have (n, N)=(*, 2), (n, N)=(*, 3), and (n, N)=(5, 13), respectively.

At a point of time $t_9$, the N value of the terminal A becomes zero, and thus the terminal A updates the contention window size. Furthermore, the terminal A randomly sets a backoff counter value to 6 using the updated contention window size.

At a point of time $t_{10}$, the N value of the terminal B becomes zero, and thus the terminal B updates the contention window size (or contention window value). Furthermore, the terminal B randomly sets a backoff counter value to 7 using the updated contention window size.

At a point of time $t_{11}$, the backoff counter value of the terminal C becomes zero, and thus the terminal C starts to send a synchronization signal.

At a point of time $t_{12}$, the terminal A, the terminal B, and the terminal C have (n, N)=(2, 12), (n, N)=(4, 13), and (n, N)=(*, 7), respectively.

At a point of time $t_{13}$, the backoff counter value of the terminal A becomes zero, and thus the terminal A starts to send a synchronization signal.

At a point of time $t_{14}$, the terminal A, the terminal B, and the terminal C have (n, N)=(*, 9), (n, N)=(1, 10), and (n, N)=(*, 4), respectively.

At a point of time t15, the backoff counter value of the terminal B becomes zero, and thus the terminal B starts to send a synchronization signal.

A method of sending, by terminals, synchronization signals using the random access method within a synchronization period has been described with reference to FIGS. 13, 14, and 15. However, discontinuity exists between synchronization periods on a time axis because the synchronization period is repeatedly present at specific locations of each frame.

Figure 16:
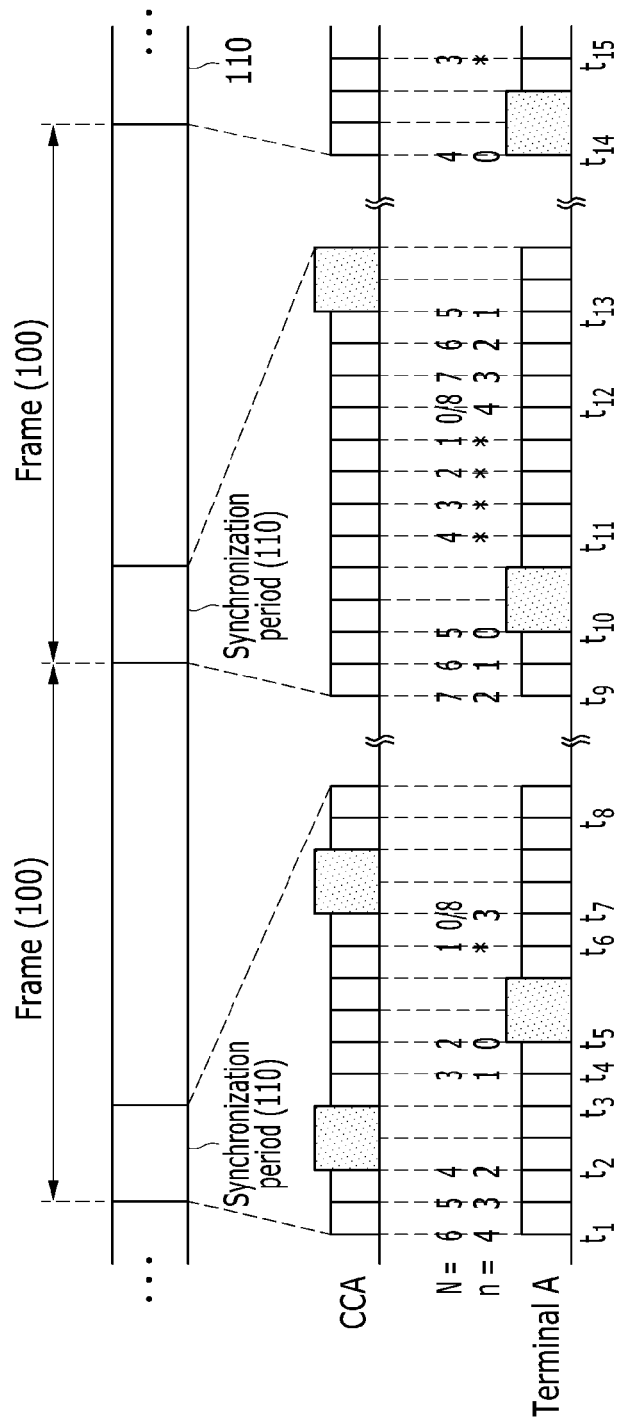
FIG. 16 is a diagram showing an example in which a terminal A sends a synchronization signal while performing CCA at a discontinuous point of a synchronization period if the random access method of FIG. 12 is used.

FIG. 16 is a diagram showing an example in which a terminal A sends a synchronization signal while performing CCA at a discontinuous point of a synchronization period if the random access method of FIG. 12 is used. In FIG. 16, the size of a contention window always becomes 8 after the size of the contention window is updated, for convenience of description, but the contention window size may be changed along with the update.

At a point of time $t_1$, it is assumed that the terminal A has (4, 6) as a value (n, N).

At a point of time $t_2$, the terminal A detects that a channel is busy through CCA, and the terminal A stops the reduction of n and N.

When the channel becomes idle at a point of time $t_3$, the terminal A starts the reduction of n and N again at a point of time t4.

At a point of time $t_5$, the backoff counter value of the terminal A becomes zero, and thus the terminal A starts to send a synchronization signal.

At a point of time $t_6$, the terminal A has 1 as the N value and again starts to reduce the N value that is stopped along with the transmission of the synchronization signal. Furthermore, the terminal A performs a process of reducing only the counter N value without setting a backoff counter value as a specific integer value (i.e., n=*).

At a point of time $t_7$, the N value of the terminal A becomes zero, and thus the terminal A updates a contention window size. Furthermore, the terminal A randomly sets the backoff counter value to 3 using the updated contention window size 8. Furthermore, at the point of time $t_7$, the terminal A detects that a channel is busy through CCA and stops the reduction of the value (n, N).

At a point of time $t_8$ after one backoff slot in the state in which the channel is idle, the terminal A may reduce the value (n, N) again, but the transmission of the synchronization signal is unable to be completed within the remaining time of the synchronization period. Accordingly, the terminal A does not start to decrease n and N at the point of time $t_8$.

A point of time $t_9$ is a point of time at which the synchronization period of a next frame is started. At the point of time $t_9$, the terminal A has values n=2 and N=7. Furthermore, the terminal A starts to reduce the values n and N again.

At a point of time $t_{10}$, the backoff counter value of the terminal A becomes zero, and thus the terminal A starts to send a synchronization signal.

At a point of time $t_{11}$, the terminal A has 4 as an N value and starts to reduce the N value that is stopped along with the transmission of the synchronization signal. Furthermore, the terminal A performs a process of reducing only the counter N without setting a backoff counter value as a specific integer value (i.e., n=*).

At a point of time $t_{12}$, the N value of the terminal A becomes zero, and thus the terminal A updates the contention window size. The terminal A randomly sets a backoff counter value to 4 using the updated contention window size 8.

At a point of time $t_{13}$, the terminal A detects that a channel is busy through CCA and stops the reduction of the values n and N.

A point of time $t_{14}$ is a point of time at which the synchronization period of a next frame is started. At the point of time $t_{14}$, the terminal A has values n=0 and N=4. Since the terminal A has n=0, the terminal A starts to send a synchronization signal.

At a point of time $t_{15}$, the terminal A has a value N=3 and starts to reduce the value N that is stopped along with the transmission of the synchronization signal.

The aforementioned contention window size (interchangeably used with "contention window" or "contention window value" in this specification) may be determined by taking into consideration the number of surrounding terminals. In order to reduce a probability that synchronization signals may collide against each other, the terminals reduce frequency of the transmission of synchronization signals if the number of surrounding terminals is large and increase frequency of the transmission of synchronization signals if the number of surrounding terminals is small. However, it is not easy to determine the number of surrounding terminals, and overhead may be high although the number of surrounding terminals is correctly determined. Accordingly, in the following exemplary embodiment of the present invention, the number of surrounding terminals is not directly used to determine the value of a contention window. That is, in an exemplary embodiment of the present invention, a method of constantly maintaining frequency of the transmission of synchronization signals regardless of the number of terminals in a specific area is used.

A method of constantly maintaining frequency of synchronization signals transmitted in a specific area uses the time difference between the time when a predetermined synchronization signal is received and the time when a next synchronization signal is received (hereinafter referred to as an "inter-arrival time (IAT)"). For example, a terminal previously determines a target IAT (hereinafter referred to as a "TIAT") and measures an IAT measured (hereinafter referred to as a measured IAT (MIAT)") using a synchronization signal received from a surrounding terminal. The terminal updates a contention window value so that a difference between the TIAT value and the MIAT is reduced. An idle time, that is, the length of the time when a channel is idle, until a next synchronization signal is received after the reception of a predetermined synchronization signal is completed, may be used instead of the IAT. In this case, a value obtained by subtracting the length of the synchronization signal from the IAT is the same as the idle time. In an exemplary embodiment of the present invention, an example in which the IAT is used is described.

Each of terminals calculates an MIAT in the area in which the terminal is placed using an IAT measured for a specific time. For example, a terminal may determine the time window of a size $W_A$ and calculate an MIAT as an average value of IATs measured for the size $W_A$ from the past to the present. For another example, a terminal may use a method of updating an MIAT according to Equation 1 whenever a new synchronization signal is received.

$$\text{MIAT} = \beta_A \cdot \text{MIAT} + (1-\beta_A) \cdot \text{IAT} \quad \text{(Equation 1)}$$

In Equation 1, $0 \leq \beta_A \leq 1$, and the IAT denotes an IAT measured using a finally received synchronization signal.

Each of terminals may determine whether to increase or decrease its own contention window value using the pattern of a received synchronization signal. However, the synchronization signals of terminals at close locations have similar reception patterns. Accordingly, the difference of contention window values may not be reduced if a difference between the values of the contention windows of two terminals is high. In this case, a difference between the transmission rates of the synchronization signals of the two terminals at close locations may be high. In order to solve such a problem, each of the terminals may estimate an average contention window value (hereinafter referred to as "$CW_{oth}$") of other surrounding terminals and use the estimated $CW_{oth}$ to update its own contention window value. A method of updating its own contention window value by a terminal using estimated $CW_{oth}$ is described with reference to Table 1 below.

As described with reference to FIG. 5, a synchronization signal may include the contention window value of a terminal that has sent the synchronization signal. A terminal which has received the synchronization signal estimates average contention window value $CW_{oth}$ of other surrounding terminals using the contention window value included in the received synchronization signal. For example, the terminal may calculate the value $CW_{oth}$ by determining a time window $W_B$ and then averaging CWs received for $W_B$ from the past to the present. For another example, the terminal may use a method of updating the value $CW_{oth}$ according to Equation 2 below whenever a new synchronization signal is received.

$$CW_{oth} = \beta_B \cdot CW_{oth} + (1-\beta_B) \cdot CW \quad \text{(Equation 2)}$$

In Equation 2, $0 \leq \beta_B < 1$, and the CW denotes a contention window value included in a finally received synchronization signal.

In some embodiments, the value $CW_{oth}$ may be updated using Equation 3 below.

$$CW_{oth} = \frac{W}{V} \quad \text{(Equation 3)}$$

In Equation 3, $V = \beta_C \cdot V + (1-\beta_C) \cdot CW$, $W = \beta_D \cdot W + (1-\beta_D) \cdot (CW)^2$, and $\beta_C$ and $\beta_D$ satisfy $0 \leq \beta_C \leq 1$ and $0 \leq \beta_D \leq 1$, respectively. Furthermore, the CW denotes a contention window value included in a finally received synchronization signal.

Table 1 below illustrates a rule in which a terminal updates its own contention window if the terminal is aware of the estimated value $CW_{oth}$ of an average contention window value of surrounding terminals. In Table 1, each of $C_1$, $C_2$, $D_1$, and $D_2$ is a real number greater than 1. $\alpha_n$ (n=1, 2, 3, . . . 16) is a constant multiplied when a contention window value is updated. $\alpha_n$ has a value greater than 1 if the value of a contention window needs to be increased after update and a value smaller than 1 if the value of a contention window needs to be decreased after update. If a terminal is unaware of the estimated value $CW_{oth}$ of an average contention window value of surrounding terminals, $\alpha_1 = \alpha_2 = \alpha_3 = \alpha_4$, $\alpha_5 = \alpha_6 = \alpha_7 = \alpha_8$, $\alpha_9 = \alpha_{10} = \alpha_{11} = \alpha_{12}$ and $\alpha_{13} = \alpha_{14} = \alpha_{15} = \alpha_{16}$ are satisfied.

TABLE 1

|  | $CW < \frac{CW_{oth}}{C_1}$ | $\frac{CW_{oth}}{C_1} < CW < CW_{oth}$ | $CW_{oth} < CW < C_2 CW_{oth}$ | $C_2 CW_{oth} < CW$ |
|---|---|---|---|---|
| $MIAT < \frac{TIAT}{D_1}$ | $CW := \alpha_1 CW$ | $CW := \alpha_2 CW$ | $CW := \alpha_3 CW$ | $CW := \alpha_4 CW$ |
| $\frac{TIAT}{D_1} < MIAT < TIAT$ | $CW := \alpha_5 CW$ | $CW := \alpha_6 CW$ | $CW := \alpha_7 CW$ | $CW := \alpha_8 CW$ |
| $TIAT < MIAT < D_2 TIAT$ | $CW := \alpha_9 CW$ | $CW := \alpha_{10} CW$ | $CW := \alpha_{11} CW$ | $CW := \alpha_{12} CW$ |
| $D_2 TIAT < MIAT$ | $CW := \alpha_{13} CW$ | $CW := \alpha_{14} CW$ | $CW := \alpha_{15} CW$ | $CW := \alpha_{16} CW$ |

Table 2 is a simply summarized table if $C_1=C_2=r>1$, $\alpha_1=\alpha_5=4$, $\alpha_2=\alpha_3=\alpha_6=\alpha_7=\sqrt{2}$, $$\alpha_4 = \alpha_8 = \frac{1}{\sqrt{2}}, \alpha_9 = \alpha_{13} = \sqrt{2},$$

$$\alpha_{10} = \alpha_{11} = \alpha_{14} = \alpha_{15} = \frac{1}{\sqrt{2}}, \text{ and } \alpha_{12} = \alpha_{16} = \frac{1}{4}$$

in Table 1.

TABLE 2

|  | $CW < \frac{CW_{oth}}{r}$ | $\frac{CW_{oth}}{r} < CW < rCW_{oth}$ | $rCW_{oth} < CW$ |
|---|---|---|---|
| MIAT < TIAT | CW := 4CW | CW := $\sqrt{2}$CW | CW := $\frac{1}{\sqrt{2}}$CW |
| TIAT < MIAT | CW := $\sqrt{2}$CW | CW := $\frac{1}{\sqrt{2}}$CW | CW := $\frac{1}{4}$CW |

A terminal may perform the following three operations when it receives a synchronization signal. The three operations include the update of an MIAT, the update of a value $CW_{oth}$, and its own timing. The timing denotes the update of the phase value of a synchronization timer. The update of the MIAT and the update of the value $CW_{oth}$ have been described above, and the timing is described below. A method of updating its own timing by a terminal is performed using the reception time of a received synchronization signal.

Figure 17:
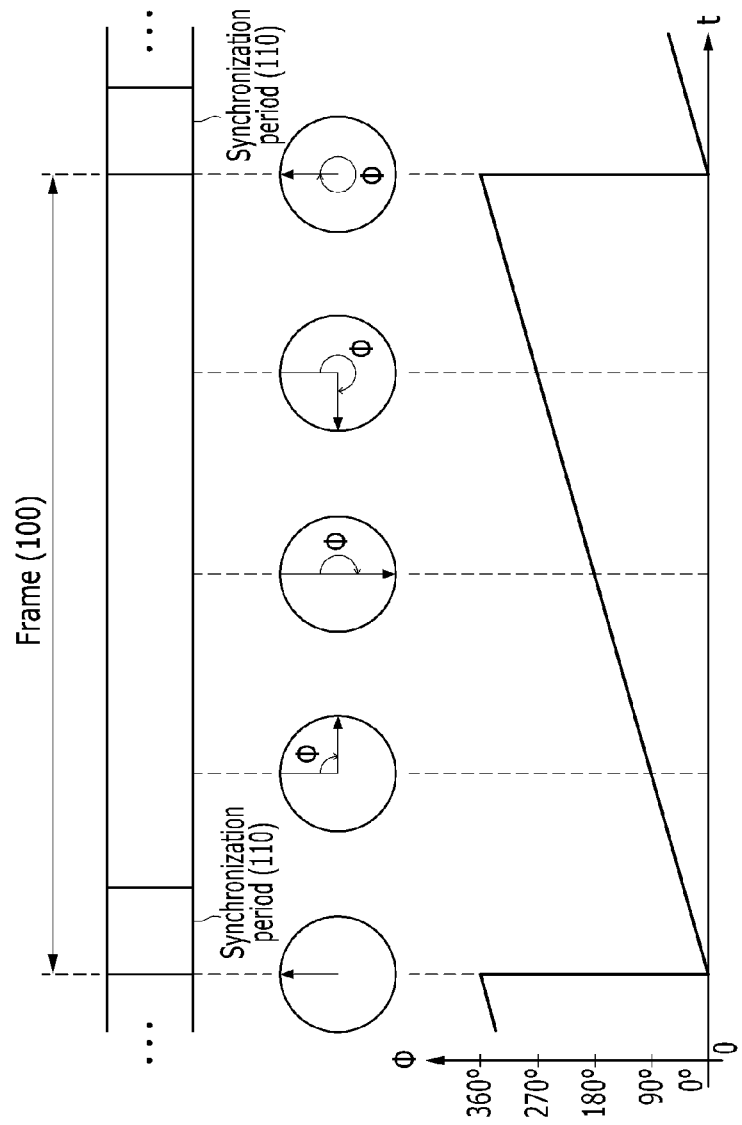
FIG. 17 is a diagram showing the relationship between a frame and the phase $\phi$ of a synchronization timer.

A terminal has a synchronization timer, and a point of time at which the phase φ of the synchronization timer becomes 360 degrees is the end or starting point of time of a frame. FIG. 17 is a diagram showing the relationship between a frame and the phase φ of a synchronization timer. As shown in FIG. 17, a point of time at which the phase φ of a synchronization timer becomes 360 degrees is the end or start point of time of a frame.

Figure 18:
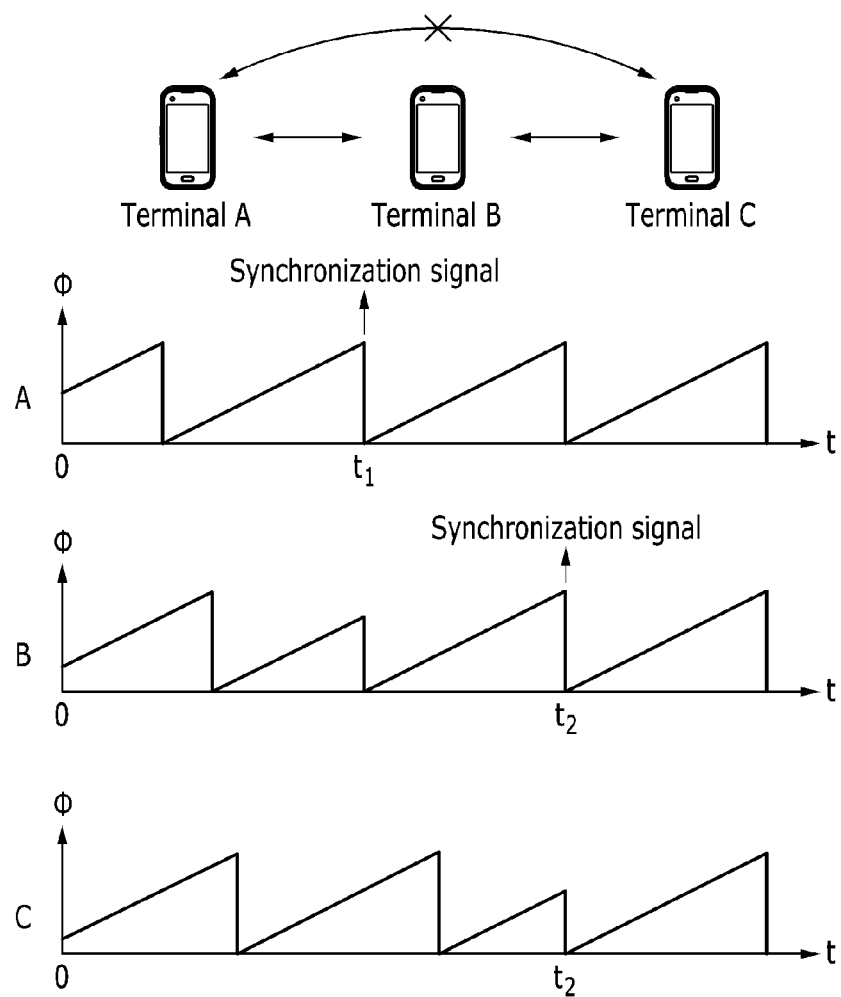
FIG. 18 is a diagram showing a method of performing synchronization by a terminal while sending/receiving a synchronization signal in accordance with an exemplary embodiment of the present invention.

FIG. 18 is a diagram showing a method of performing synchronization by a terminal while sending/receiving a synchronization signal in accordance with an exemplary embodiment of the present invention. In FIG. 18, it is assumed that a terminal B is at the distance at which it is able to communicate with a terminal A and a terminal C, and the terminal A and the terminal C are at the distance at which they are unable to communicate with each other.

As shown in FIG. 18, the terminals A, B, and C have not been synchronized at a point of time 0.

At a point of time $t_1$, the phase of the synchronization timer of the terminal A becomes 360 degrees, and the terminal A sends a synchronization signal. After receiving the synchronization signal transmitted by the terminal A, the terminal B matches its synchronization timer with the synchronization timer of the terminal A by updating its own synchronization timer. However, the terminal C does not update its own synchronization timer because it does not receive the synchronization signal of the terminal A.

At a point of time $t_2$, the phase of the synchronization timer of the terminal B becomes 360 degrees, and the terminal B sends a synchronization signal. After receiving the synchronization signal transmitted by the terminal B, the terminal C matches its own synchronization timer with the synchronization timer of the terminal B by updating its own synchronization timer. In this case, the terminal A receives the synchronization signal transmitted by the terminal B, but does not update the synchronization timer because the terminal A has already been synchronized with the terminal B.

As shown in FIG. 18, each of the terminals does not always send a synchronization signal if the phase of its own synchronization timer becomes 360 degrees. The transmission of a synchronization signal is performed through contention-based random access as described above. Accordingly, a synchronization signal is not transmitted at a point of time at which a frame is started, at which the phase of a synchronization timer becomes 360 degrees, but may be delayed and transmitted by a specific number of backoff slots. In FIG. 18, it has been assumed that delay in the transmission of a synchronization signal attributable to a random backoff is not indicated, but the synchronization signal is transmitted at a point of time at which a frame is started, for convenience of description. Delay in the transmission of a synchronization signal attributable to a random backoff is described in detail below with reference to FIG. 21.

Figure 19:
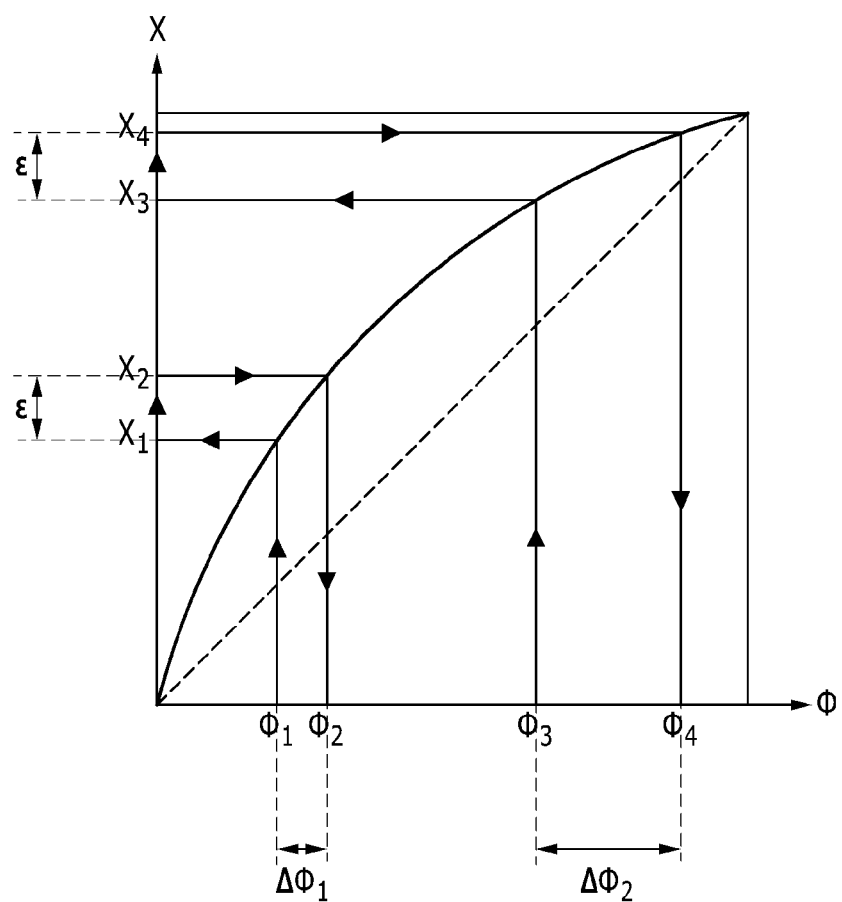
FIG. 19 is a diagram showing a method of updating a synchronization timer in accordance with an exemplary embodiment of the present invention.

FIG. 19 is a diagram showing a method of updating a synchronization timer in accordance with an exemplary embodiment of the present invention. If a terminal having $\phi_1$ as the phase value of a synchronization timer receives a synchronization signal, the terminal updates the phase value of the synchronization timer with $\phi_2$ through a process described below.

In FIG. 19, it is assumed that the terminal has $\phi_1$ as the phase value of the synchronization timer when it receives a synchronization signal.

The terminal calculates $x_1$ according to Equation 4 below.

$$x_1 = f(\phi_1) \quad \text{(Equation 4)}$$

In Equation 4, f(·) passes through predetermined (0, 0) and (1, 1), and is a function in which f'(·)>0 and f"(·)<0 in 0<x<1.

Furthermore, the terminal calculates $x_2$ according to Equation 5 below.

$$x_2 = \max(x_1 + \in, 1) \quad \text{(Equation 5)}$$

In Equation 5, $\in$ is a predetermined constant.

Furthermore, the terminal calculates $\phi_2$ as in Equation 6 below.

$$\phi_2 = f^{-1}(x_2) \quad \text{(Equation 6)}$$

As shown in FIG. 19, the terminal updates the phase value $\phi_3$ of its own synchronization timer with $\phi_4$ as described above. Furthermore, it may be seen that a relationship "$\Delta\phi_1 = \phi_2 - \phi_1 < \phi_4 - \phi_3 = \Delta\phi_2$" is established. That is, the update of a phase value of the synchronization timer is differently determined depending on a phase value of the synchronization timer when a synchronization signal is received.

The following method may be used as a method of updating the phase value of a synchronization timer by a terminal when it receives a synchronization signal, unlike in FIG. 19. A method illustrated in FIG. 20 is used as another method of updating the phase value of a synchronization timer by a terminal when it receives a synchronization signal.

Figure 20:
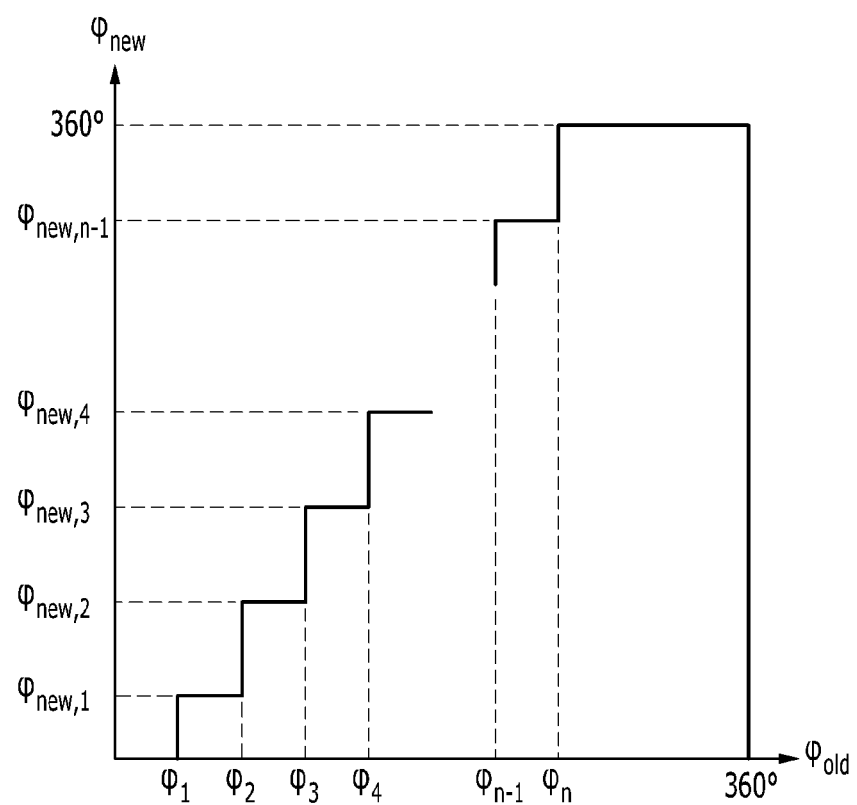
FIG. 20 is a diagram showing a method of updating a synchronization timer in accordance with another exemplary embodiment of the present invention.

FIG. 20 is a diagram showing a method of updating a synchronization timer in accordance with another exemplary embodiment of the present invention.

As shown in FIG. 20, when a terminal receives a synchronization signal, he terminal updates the phase value of a synchronization timer to $\phi_{new,m}$ if the phase value of the synchronization timer is between $\phi_m$ and $\phi_{m+1}$. For example, if the phase value of a synchronization timer is between $\phi_1$ and $\phi_2$, a terminal updates the phase value to $\phi_{new,1}$, that is, a predetermined value, regardless of the value of a received synchronization signal.

A special example of the method illustrated in FIG. 20 includes a method of maintaining a current phase value of a synchronization timer by a terminal without a change if the phase value of the synchronization timer is smaller than 180 degrees when it receives a synchronization signal and updating the phase value of the synchronization timer to 360 degrees if the phase value of the synchronization timer is greater than 180 degrees when it receives the synchronization signal.

Figure 21:
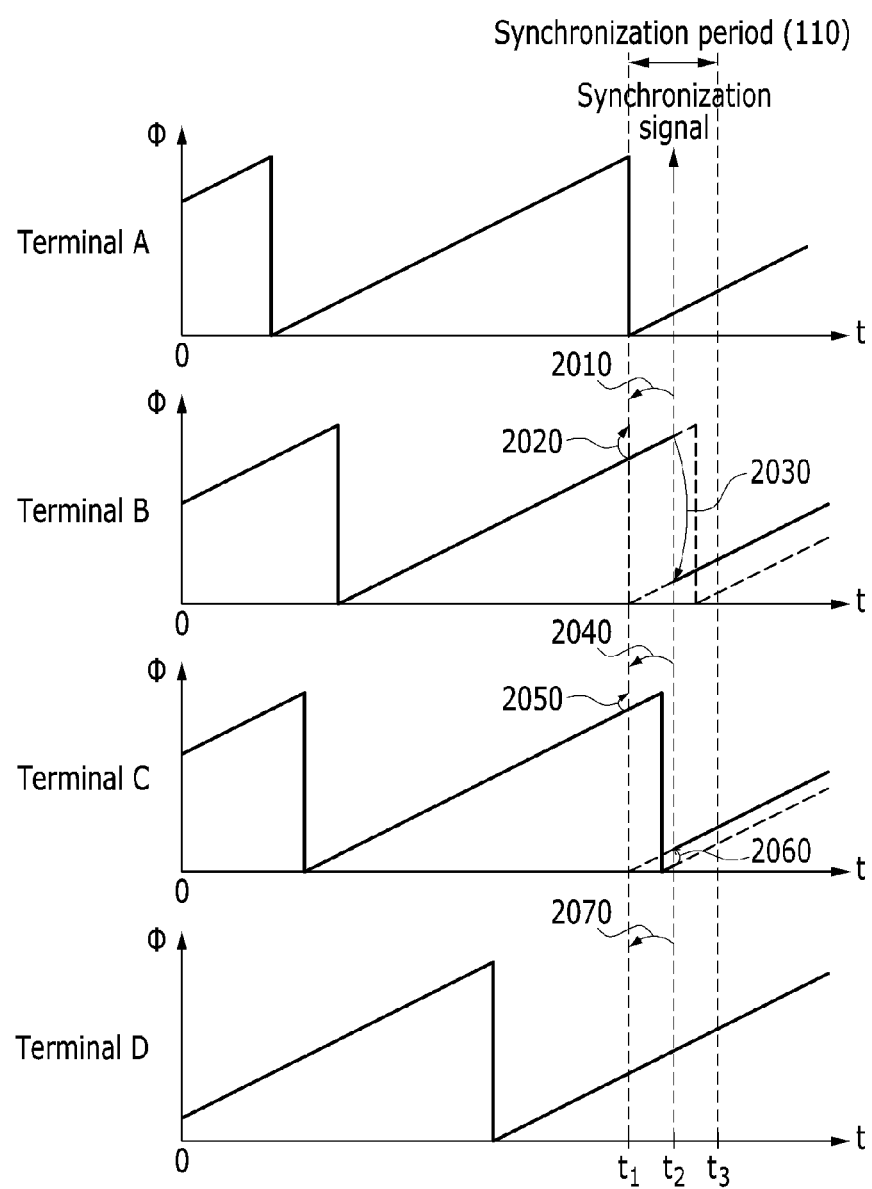
FIG. 21 is a diagram showing a method of updating the phase of a synchronization timer if a synchronization signal is subject to time delay from a point of time at which a frame is started due to a random backoff in accordance with an exemplary embodiment of the present invention.

FIG. 21 is a diagram showing a method of updating the phase of a synchronization timer if a synchronization signal is subject to time delay from a point of time at which a frame is started due to a random backoff in accordance with an exemplary embodiment of the present invention. In FIG. 21, it is assumed that all of terminals A, B, C, and D are at a distance at which they can communicate with each other.

At a point of time $t_1$, the phase value of the synchronization timer of the terminal A becomes 360 degrees.

The transmission of a synchronization signal (or timing reference signal) by the terminal A occurs at a point of time $t_2$ after the point of time $t_1$ because the synchronization signal is transmitted according to a random backoff procedure. In this case, the point of time $t_2$ is between the point of time $t_1$ and a point of time $t_3$.

At the point of time $t_2$, the terminal B receives a synchronization signal transmitted by the terminal A. In this case, the terminal B is able to know that a point of time at which the frame of the terminal A is started is not the point of time $t_2$, but is the point of time $t_1$, using a backoff indicator included in the synchronization signal received from the terminal A (refer to an arrow 2010). The terminal B updates the phase value of a synchronization timer with the phase value of the synchronization timer at the point of time $t_1$ (refer to an arrow 2020). In this case, the method of FIG. 19 or 20 may be used as a method of updating the phase value of the synchronization timer. Furthermore, as indicated by an arrow 2030, the terminal B calculates the phase value of the synchronization timer at the current point of time $t_2$ using the phase value of the synchronization timer updated at the point of time $t_1$. Accordingly, after the phase value of the synchronization timer is updated, the terminal B is synchronized with the terminal A.

At the point of time $t_2$, the terminal C receives the synchronization signal transmitted by the terminal A. In this case, the terminal C is able to know that a point of time at which the frame of the terminal A is started is not the point of time $t_2$, but is the point of time $t_1$, using the backoff indicator included in the synchronization signal received from the terminal A (refer to an arrow 2040). The terminal C updates the phase value of a synchronization timer with the phase value of the synchronization timer at the point of time $t_1$ (refer to an arrow 2050). In this case, the method of FIG. 19 or 20 may be used as a method of updating the phase value of the synchronization timer. Furthermore, as indicated by an arrow 2060, the terminal C calculates the phase value of the synchronization timer at the current point of time $t_2$ using the phase value of the synchronization timer updated at the point of time $t_1$. Accordingly, after the phase value of the synchronization timer is updated, the terminal C is synchronized with the terminal A.

At the point of time $t_2$, the terminal D receives the synchronization signal transmitted by the terminal A. In this case, the terminal D is able to know that a point of time at which the frame of the terminal A is started is not the point of time $t_2$, but is the point of time $t_1$ using the backoff indicator included in the synchronization signal received from the terminal A (refer to an arrow 2070). The terminal D updates the phase value of a synchronization timer with the phase value of the synchronization timer at the point of time $t_1$. In this case, the method of FIG. 19 or 20 may be used as a method of updating the phase value of the synchronization timer. As shown in FIG. 21, the synchronization signal may be received at any location within a synchronization period 110. Accordingly, if a terminal has updated the phase value of its own synchronization timer using a synchronization signal after receiving the synchronization signal, the time remaining in the synchronization period of a corresponding frame may not be sufficient to send a synchronization signal. In this case, the terminal may not perform a random access procedure for the transmission of a synchronization signal in the corresponding frame, but may perform a random access procedure for the transmission of the synchronization signal in a next frame.

The terminal performs the initial synchronization procedure (refer to S410 of FIG. 4) as part of an initialization procedure. The initialization of the terminal may be performed when the terminal is powered on or when the terminal remains in an inactive state due to stopped communication and then deviates from the inactive state. An initial synchronization procedure in accordance with an exemplary embodiment of the present invention is described below with reference to FIG. 22.

Figure 22:
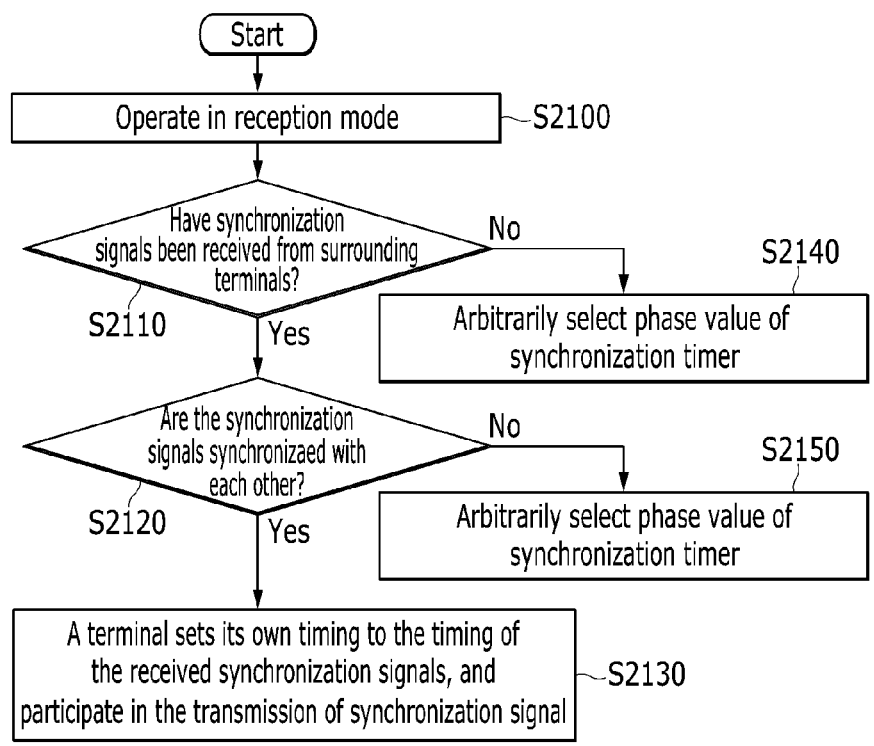
FIG. 22 illustrates an initial synchronization procedure in accordance with an exemplary embodiment of the present invention.

FIG. 22 illustrates an initial synchronization procedure in accordance with an exemplary embodiment of the present invention.

First, a terminal operates in reception mode for a predetermined time before it sends a synchronization signal at step S2100. While operating in reception mode, the terminal determines whether there is a synchronization signal transmitted by surrounding terminals at step S2110.

If, as a result of the determination, a synchronization signals are detected at step S2110, the terminal determines whether the detected synchronization signals are synchronization signals transmitted by synchronized terminals (e.g., terminals forming a network) at step S2120. For example, if a synchronization signals are periodically received and the point of time at which a frame is started is consistently estimated based on the synchronization signals, the terminal may determine that the detected synchronization signals are synchronization signals transmitted by synchronized terminals.

If, as a result of the determination at step S2120, the synchronization signals are synchronization signals transmitted by synchronized terminals, the terminal matches up the phase of its own synchronization timer with the phase of a synchronization timer included in the received synchronization signals and participates in the transmission of a synchronization signal through the aforementioned random access procedure at step S2130. In this case, the terminal may perform the synchronization maintenance and management procedure S420 of FIG. 4 because it has joined group of terminals in synchrony.

If, as a result of the determination at step S2110, a synchronization signal is not detected, the terminal determines that there is no terminal which sends a synchronization signal. In this case, the terminal arbitrarily selects the phase value of its own synchronization timer at step S2140. Furthermore, the terminal may start the transmission of a synchronization signal using the aforementioned random access procedure and perform the synchronization maintenance and management procedure S420 of FIG. 4.

If, as a result of the determination at step S2120, the synchronization signals are not transmitted by a synchronized terminals, the terminal arbitrarily selects the phase value of its own synchronization timer at step S2150. Furthermore, the terminal performs a procedure for performing synchronization with surrounding terminals. For example, if a point of time at which a frame is started, estimated based on a received synchronization signal, is not consistent or the number of points of time at which a frame is started is plural, the terminal may determine that the detected synchronization signals have been transmitted by terminals not synchronized with each other. A method of arbitrarily selecting the phase value of its own synchronization timer by the terminal may be a method of selecting a random real number or a method of arbitrarily selecting one of the phase values of received synchronization signals.

The terminal sends a synchronization signal in a synchronization period according to its own synchronization timer using the aforementioned random access method. The terminal receives synchronization signals transmitted by surrounding terminals while operating in reception mode except a case where the terminal sends a synchronization signal. In this case, since the terminal has not been synchronized with surrounding terminals, the synchronization signals may be received any locations of a frame in addition to a synchronization period. When a synchronization signal is received, the terminal performs the update of an MIAT, the update of a value $CW_{oth}$, and the update of phase value of its own synchronization timer. The update of the phase value of the synchronization timer may be performed using the method of FIG. 19 or another method. After updating the phase value of the synchronization timer, the terminal does not send a synchronization signal using random access in a current frame (i.e., a frame newly determined by the update of the phase of the synchronization timer), but may perform random access for the transmission of the synchronization signal in the synchronization period of a next frame. After repeating such processes, the terminal may perform the synchronization maintenance and management procedure S420 of FIG. 4 if the terminal determines that it has been synchronized with surrounding terminals. For example, if a synchronization signal is periodically received and the point of time at which a frame is started, estimated from the received synchronization signal, is consistently within an error range for a specific period of time duration, the terminal may determine that it has been synchronized with surrounding terminals.

If the terminal is synchronized with surrounding terminals through the initial synchronization procedure, it performs the synchronization maintenance and management procedure (corresponding to S430 of FIG. 4). The synchronization maintenance and management procedure can prevent a timing drift generated due to an error of the oscillators of terminals and asynchronism attributable to the appearance of an asynchronous new terminal or interference with a wireless network conforming to a different protocol in the same area. Furthermore, a situation in which asynchronism occurs may be detected through the synchronization maintenance and management procedure. A synchronization maintenance and management procedure in accordance with an exemplary embodiment of the present invention is described below.

A terminal sends a synchronization signal in the synchronization period of a frame using the aforementioned random access method. The terminal receives synchronization signals transmitted by surrounding terminals while operating in reception mode except a case where it sends a synchronization signal. In this case, the terminal receives the synchronization signals in the synchronization period because it has already been synchronized with the surrounding terminals. Accordingly, the terminal may turn off some of its functions in a period in which the synchronization signals are not received in order to reduce power consumption.

When a synchronization signal is received, the terminal performs the update of an MIAT, the update of a value $CW_{oth}$, and the update of the phase value of its own synchronization timer. The update of the phase value of the synchronization timer may be performed using the method of FIG. 19 or 20. In the synchronization maintenance and management procedure, the phase value of the synchronization timer after update is not greatly different from that of the synchronization timer prior to the update. Even after updating the phase value of the synchronization timer, the terminal continues to perform random access for the transmission of a synchronization signal in a current frame.

While repeating such processes, the terminal continues to monitor whether synchronization with the surrounding terminals has deviated from an error range. If a synchronization error exceeds a specific error range, the terminal may start an initial synchronization procedure or may start a re-synchronization procedure to be described below. The terminal operating in a power consumption reduction mode may periodically release the power consumption reduction mode and perform a full scan in at least one frame in order to detect whether it has lost synchronization. If the terminal has entered the power consumption detection mode after starting the transmission of a synchronization signal at step S2140 of FIG. 22 through such periodic full scan, the terminal may detect a terminal not synchronized with the terminal.

Frames having different lengths may be used in the aforementioned initial synchronization procedure and synchronization maintenance and management procedure. For example, in order to reduce the synchronization time between terminals performing an initial synchronization procedure, a frame used in the initial synchronization procedure may have a shorter length than a frame used in a synchronization maintenance and management procedure.

If a synchronized terminal is out of synchronization due to a timing drift or interference from a wireless network conforming to a different protocol in the same area, the terminal performs the re-synchronization procedure S430 of FIG. 4. Such a re-synchronization procedure is similar to the initial synchronization procedure, but is different from the initial synchronization procedure as follows. A frame used in the initial synchronization procedure may have a different length from that of a frame used in the synchronization maintenance and management procedure. In contrast, a frame used in the re-synchronization procedure has the same length as a frame used in the synchronization maintenance and management procedure. In the initial synchronization procedure, a radio channel is scanned for a specific time duration in order to determine whether a synchronization signal is present. In contrast, in the re-synchronization procedure, a scan may not be performed or may be performed for a shorter time duration than the time duration in the initial synchronization procedure.

Figure 23:
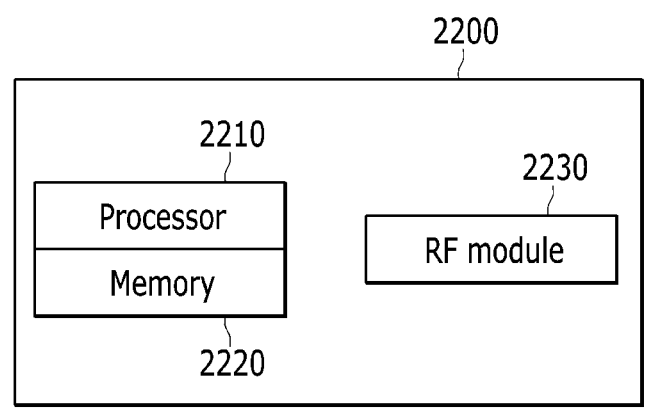
FIG. 23 is a diagram showing a terminal in accordance with an exemplary embodiment of the present invention.

FIG. 23 is a diagram showing a terminal in accordance with an exemplary embodiment of the present invention.

As shown in FIG. 23, the terminal 2200 in accordance with an exemplary embodiment of the present invention includes a processor 2210, a memory 2220, and an RF module 2230.

The processor 2210 may be configured to perform the procedures, methods, and functions described with reference to FIGS. 1 to 21.

The memory 2220 is connected to the processor 2210, and stores various information related to the operation of the processor 2210.

The RF module 2230 is connected to an antenna (not shown), and sends or receives radio signals. Furthermore, the antenna may be implemented using a single antenna or a multiple (MIMO) antenna.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A synchronization method of a first terminal in a distributed wireless communication system, comprising:
    receiving first synchronization signals from the first terminal and second terminals different from the first terminal;
    calculating an average inter-arrival time between the first synchronization signals;
    calculating an average contention window of the second terminals using the first synchronization signals;
    setting a first contention window which is a contention window of the first terminal using the average inter-arrival time and the average contention window; and
    determining whether or not to send a synchronization signal in response to the first contention window.

2. The synchronization method of claim 1, wherein determining whether or not to send the synchronization signal comprises:
    randomly selecting a backoff counter using the first contention window;
    decreasing a value of the backoff counter if a channel is idle during backoff slots of a plurality of periods split from a synchronization period; and
    sending the synchronization signal if the value of the backoff counter is zero.

3. The synchronization method of claim 2, further comprising:
    setting the value of the backoff counter as a predetermined value after sending the synchronization signal; and
    updating the first contention window if the set value of the backoff counter is zero.

\* \* \* \* \*